United States Patent
Dronen et al.

(10) Patent No.: US 10,938,738 B2
(45) Date of Patent: Mar. 2, 2021

(54) RESOURCE ALLOCATION IN DISTRIBUTED PROCESSING SYSTEMS

(71) Applicant: Pearson Education, Inc., Bloomington, MN (US)

(72) Inventors: Nicholas A. Dronen, Longmont, CO (US); Peter W. Foltz, Boulder, CO (US); Holly Garner, Raleigh, NC (US); Miles T. Loring, North Liberty, IA (US); Vishal Kapoor, Iowa City, IA (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

(21) Appl. No.: 16/725,571

(22) Filed: Dec. 23, 2019

(65) Prior Publication Data

US 2020/0136990 A1    Apr. 30, 2020

Related U.S. Application Data

(60) Continuation of application No. 15/824,960, filed on Nov. 28, 2017, now Pat. No. 10,560,397, which is a division of application No. 14/869,748, filed on Sep. 29, 2015, now Pat. No. 10,148,589.

(60) Provisional application No. 62/057,140, filed on Sep. 29, 2014.

(51) Int. Cl.
*H04L 12/911* (2013.01)
*G06F 9/48* (2006.01)
*G06F 9/50* (2006.01)

(52) U.S. Cl.
CPC .......... *H04L 47/783* (2013.01); *G06F 9/4881* (2013.01); *G06F 9/5072* (2013.01)

(58) Field of Classification Search
CPC ..... G06F 9/4881; G06F 9/5072; H04L 47/783
See application file for complete search history.

(56) References Cited

U.S. PATENT DOCUMENTS

| | | | | |
|---|---|---|---|---|
| 7,092,985 | B2* | 8/2006 | Hubbard | G06F 9/5044 |
| | | | | 709/201 |
| 8,010,703 | B2* | 8/2011 | Hubbard | G06F 9/5027 |
| | | | | 709/201 |
| 9,195,509 | B2* | 11/2015 | Bartfai-Walcott | G06F 9/5072 |
| 9,582,335 | B2* | 2/2017 | Doukhvalov | G06F 21/567 |
| 9,667,706 | B2* | 5/2017 | Garner | H04L 67/10 |
| 2002/0107903 | A1* | 8/2002 | Richter | H04L 67/28 |
| | | | | 709/201 |
| 2006/0271823 | A1* | 11/2006 | Smith | H04L 43/18 |
| | | | | 714/37 |

(Continued)

*Primary Examiner* — Michael C Lai
(74) *Attorney, Agent, or Firm* — Quarles and Brady LLP

(57) ABSTRACT

A distributed processing system is disclosed herein. The distributed processing system includes a server, a database server, and an application server that are interconnected via a network, and connected via the network to a plurality of independent processing units. The independent processing units can include an analysis engine that is machine-learning-capable, and thus uniquely completes its processing tasks. The server can provide one or several pieces of data to one or several of the independent processing units, can receive analysis results from these one or several independent processing units, and can update the result based on a value characterizing the machine learning of the independent processing unit.

20 Claims, 17 Drawing Sheets

(56) References Cited

U.S. PATENT DOCUMENTS

2007/0143762 A1* 6/2007 Arnold .................... G06F 9/505
  718/103
2008/0253673 A1* 10/2008 Nakagawa ........... H04N 19/433
  382/239

* cited by examiner

RESOURCE ALLOCATION IN DISTRIBUTED PROCESSING SYSTEMS

CROSS-REFERENCE TO RELATED APPLICATIONS

This application is a continuation of Ser. No. 15/824,960, filed Nov. 28, 2017, and entitled "RESOURCE ALLOCATION IN DISTRIBUTED PROCESSING SYSTEMS," now U.S. Pat. No. 10,560,397, issued Feb. 11, 2020, which is a divisional of U.S. Application No. 14/869,748, filed on Sep. 29, 2015, and entitled "RESOURCE ALLOCATION IN DISTRIBUTED PROCESSING SYSTEMS," now U.S. Pat. No. 10,148,589, issued Dec. 4, 2018, which claims the benefit of U.S. Provisional Application No. 62/057,140, filed on Sep. 29, 2014, and entitled "RESOURCE ALLOCATION IN DISTRIBUTED PROCESSING SYSTEMS," the entirety of each which are hereby incorporated by reference herein.

BACKGROUND

A distributed system is a software system in which components located on networked computers communicate and coordinate their actions by passing messages. The components interact with each other in order to achieve a common goal.

Use of a distributed system to perform distributed processing provides many benefits in that distributed processing can efficiently combine and utilize processing resources at a variety of locations to quickly solve large and/or complicated problems. In one example of this, a group of networked computers may be controlled by a group of users. However, as normal use of a computer does not always use the computer's entire processing capacity, each of the computers in this group of computers may have some latent or unused processing capacity. This latent or unused processing capacity can be identified and combined together to solve another problem. Thus, use of the processing capacity of the computers of the group of computers is maximized, which maximization can lead to significant infrastructure savings associated with acquisition of otherwise needed processing capacity.

However, distributed processing still has many shortcomings which limits its usefulness. Thus, new methods, techniques, and systems are required to improve distributed processing.

BRIEF SUMMARY

One aspect of the present disclosure relates to a distributed processing network that can improve processing speeds. The network includes a source device that can provide groups of data, each of which groups of data can be associated with one or several user authors, and which groups of data together can include a processing task. The network includes a plurality of independent processing units that can receive a portion of the processing task, which portion of the processing task can include one or several of the groups of data, and which independent processing units can characterize one or several aspects of the one or several of the groups of data. The network can include a server communicatively connected to the source device and the plurality of independent processing units via a network. In some embodiments, the server can receive a signal encoding the processing task, identify a plurality of features in some of the groups of data, generate a preliminary subset from the groups of data of the processing task, calculate a subset measure for the preliminary subset, which subset measure indicates the degree to which the subset is representative of the entire processing task, maximize the subset measure by replacing some of the data groups of the subset, and provide a final subset to the plurality of independent processing units.

In some embodiments, the server can receive a characterization of the groups of data of the final subset. In some embodiments, generating the preliminary subset includes determining the desired size of the preliminary subset. In some embodiments, the server can generate at least one selection attribute for at least some of the groups of data in the preliminary subset.

In some embodiments, the server can generate an attribute vector for at least some of the groups of data of the preliminary subset. In some embodiments, the attribute vector is generated from values indicative of the identification of one or several of the selection attributes in the selected piece of data. In some embodiments, the attribute vector includes a multi-dimensional vector, and the dimensions of the attribute vector correspond with selection attributes such that each dimension of the attribute vector is associated with a unique one of the selection attributes.

In some embodiments, maximizing the subset measure includes calculating contribution factors for each of the groups of data included in the subset. In some embodiments, each of the contribution factors identifies the effect of the associated group of data on the subset measure. In some embodiments, maximizing the subset measure includes calculating contribution factors for some of the groups of data not included in the subset.

In some embodiments, maximizing the subset measure includes: identifying the group of data in the subset having a first contribution factor indicating the smallest positive effect on the subset measure, and identifying the group of data outside of the subset having a second contribution factor indicating the largest positive effect on the subset measure. In some embodiments, maximizing the subset measure includes: comparing the first contribution factor and the second contribution factor, and replacing the group of data in the subset having a first contribution factor indicating the smallest positive effect on the subset measure with the group of data outside of the subset having a second contribution factor indicating the largest positive effect on the subset measure when the second contribution factor indicates a greater positive effect than the first contribution factor. In some embodiments, maximizing the subset measure includes identifying the subset as maximized when the second contribution factor indicates a lesser positive effect than the first contribution factor.

One aspect of the present disclosure relates to a distributed processing network that can improve processing speeds. The network can include a source device that can provide groups of data, each of which groups of data can be associated with one or several user authors, and which groups of data together can form a processing task. The network can include a plurality of independent processing units that can receive a portion of the processing task, which portion of the processing task can include one or several of the groups of data, and which independent processing units can characterize one or several aspects of the one or several of the groups of data. The network can include a server communicatively connected to the source device and the plurality of independent processing units via a network. In some embodiments, the server can receive a signal encoding the processing task, identify a plurality of features in some of the groups of data, generate an attribute vector for each of some of the groups of data in the processing task, which attribute vector can include a dimension relating to the plurality of features, and which attribute vector can include a multi-dimensional vector, determine the distance between the ends of the attribute vectors, generate a subset including the pair of attribute vectors having ends separated by the greatest distance, and provide the subset to the plurality of independent processing units.

In some embodiments, the server can receive a characterization of the groups of data of the final subset. In some embodiments, generating the preliminary subset includes determining the desired size of the preliminary subset. In some embodiments, the server can generate at least one selection attribute for at least some of the groups of data in the preliminary subset.

In some embodiments, the server can generate an attribute vector for at least some of the groups of data of the preliminary subset. In some embodiments, the attribute vector is generated from values indicative of the identification of one or several of the selection attributes in the selected piece of data. In some embodiments, the attribute vector includes a multi-dimensional vector, and the dimensions of the attribute vector correspond with selection attributes such that each dimension of the attribute vector is associated with a unique one of the selection attributes.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
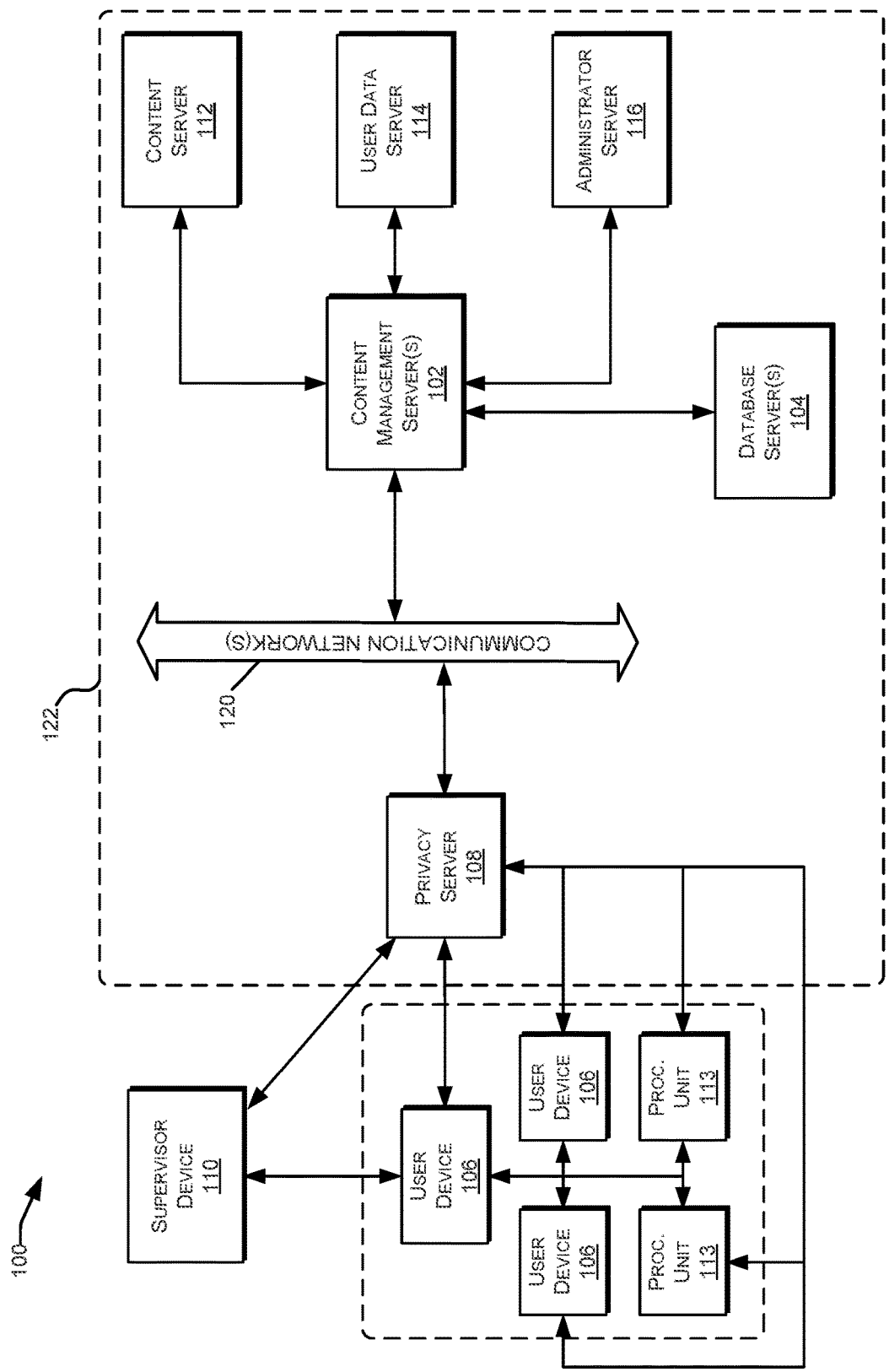
FIG. 1 is a block diagram showing illustrating an example of a data extraction and analysis system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure relates to systems, methods, and devices for increasing the efficiency and processing speed of distributed computing. Particularly, in some embodiments, distributed computing can be used to evaluate and/or analyze a plurality of unique pieces of data or data groups. In some embodiments the number of pieces of data or data groups may be large, and the processing times for some or all of the pieces of data and/or data groups can be long. Because of this, significant processing resources can be required for completion of a processing task, which can include a plurality of the pieces of data and/or data groups.

In some embodiments, the processing can be performed by one or several independent processing units which can, in some embodiments, be intelligent in that they are able to learn and adapt based on external stimulus. Particularly, the one or several independent processing units can learn and thereby improve the quality of their output as they evaluate one or several of the pieces of data. While there are many benefits of such a system of intelligent independent processing units, such a system is disadvantaged in that the evaluation of the independent processing unit is unique as it is based on the learning, which in many cases is also unique, of that independent processing unit. Further, in many instances, the uniqueness of the evaluation of the independent processing unit is based on so many variables, many of which are unknown, that it is difficult to identify the source of the uniqueness, and thereby seek to eliminate the uniqueness.

Instead of attempting to identify a source of uniqueness, in some embodiments, the uniqueness of the evaluations can be eliminated and/or mitigated through one or several standardization processes and systems.

In one embodiment, these processes and systems can utilize one or several independent processing units to provide multiple evaluations for the same piece of data and/or data group. These evaluations can be combined, and in some embodiments, combined according to an accuracy parameter that is associated with one or several independent processing units, to generate a combined evaluation. This accuracy parameter can be based on data relating to the degree of difference between one or more previous evaluations of one or more pieces of data and/or data groups by one or more independent processing units and one or more final evaluations for each of the one or more pieces of data and/or data groups.

In another embodiment, the processes and systems can simplify the processing task to mitigate the adverse effect of uniqueness on the evaluation of one or more pieces of data and/or data groups. In such an embodiment, pieces of data and/or data groups can be associated in, for example, groups of 2 (pairs), groups of 3, groups of 4, groups of 5, groups of 10, and/or any other or intermediate value. These associations of pieces of data and/or groups of data can be provided to one or several independent processing units, which independent processing units can relatively rank the pieces of data and/or groups of data from best to worst. The relative rankings can then be used to assign a final evaluation to one or several of the pieces of data and/or groups of data.

Advantageously, both of the above-mentioned embodiments increase the effective processing speed with which the processing task is completed, additionally, as both of these mentioned embodiments decrease the total number of evaluations of each of the pieces of data and/or groups of data used to generate a final evaluation. Additionally, by identifying the accuracy parameter, the distributed processing system is able to direct the pieces of data and/or groups of data to the independent processor best suited for generation of the evaluation.

With reference now to FIG. 1, a block diagram is shown illustrating various components of a content delivery network 100, also referred to herein as a distributed processing system 100, which implements and supports certain embodiments and features described herein. The content delivery network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content delivery network 100 may include one or more databases servers 104, also referred to herein as databases. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 0 and tier 1 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the content delivery network 100. Illustrative examples of databases 104 that may be maintained in certain embodiments of the content delivery network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

The content delivery network 100 also may include one or more user devices 106 and/or supervisor devices 110. User devices 106 and supervisor devices 110 may display content received via the content delivery network 100, and may support various types of user interactions with the content. In some embodiments, the user devices 106 and the supervisor devices 110 can be configured to access data in, edit data in, retrieve data from, and/or provide data to the data extraction and analysis system.

User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120. In some embodiments, the designated role of a device, including a user device 106 or a supervisor device 110 can vary based on the identity of the user using that device. Thus, in some embodiments, both user and supervisor devices 106, 110 can include the same hardware, but can be configured as one of a user device 106 or a supervisor device 110 at the time of log-in by a user to use that device.

In different contexts of data extraction and analysis systems 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location, such as a classroom, a clinic, or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The distributed processing system 100 can include one or several independent processing units 113. In some embodiments, the independent processing units 113 can each be a computing device comprising a processor, which can comprise a microprocessor, such as a microprocessor from Intel® or Advanced Micro Devices, Inc.®, or the like, memory, a user interface configured to provide information to a user and to receive one or several inputs from a user, or the like. In some embodiments, the independent processing units 113 can be computers.

In some embodiments, the independent processing units 113 can be configured to receive one or several data pieces and/or groups of data from the server 102 or other component of the distributed processing system 100 and to evaluate the one or several data pieces and/or groups of data. In some embodiments, this evaluation can include a relative ranking of the one or more pieces of data and/or the groups of data.

In some embodiments, this evaluation can include a characterization of the pieces of data and/or groups of data according to one or several criteria and/or guidelines. In some embodiments, the independent processing units 113 can be intelligent in that they are able to learn and adapt based on external stimulus. Particularly, the one or several independent processing units 113 can learn and thereby improve the quality of their output as they evaluate one or several of the pieces of data and/or groups of data. Thus, in some embodiments, the evaluations provided by the independent processing units 113 vary based on the learning of the independent processing units 113. In some embodiments, and in contrast to the independent processing units 113, the server 102 is not able to learn and adapt based on external stimulus. Thus, evaluations provided by the server 102 are performed according to instructions received by the server and are consistent unless those instructions change.

The content delivery network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in data extraction and analysis systems 100 used for professional training and educational purposes, content server 112 may include databases of training materials, presentations, plans, syllabi, reviews, evaluations, interactive programs and simulations, course models, course outlines, and various training interfaces that correspond to different materials and/or different types of user devices 106. In data extraction and analysis systems 100 used for media distribution, interactive gaming, and the like, a content server 112 may include media content files such as music, movies, television programming, games, and advertisements. In some embodiments, the one or several content servers 112 can be in communicating connection with the content management server 102 via, for example, the internet or other communication network.

In some embodiments, the content delivery network 100 can include a plurality of content servers 112 that can contain the same or different content. In some embodiments, this plurality of content servers 112 can be controlled as a part of the content delivery network 100, and in some embodiments, this plurality of content servers 112 can be controlled independent of the content delivery network 100.

In such an embodiments, data can be transferred to and/or from one or several of the plurality of content servers 112 and some or all of the other components of the content delivery network 100.

In one embodiment, for example, the content delivery network 100 can include a first content server, a second content server, a third content server, and/or a fourth content server. In some embodiments, for example, some or all of the first, second, third, and fourth content servers can host websites, which can be unique. These websites can contain information that can be retrieved and/or used by some or all of the other components of the content delivery network 100. In some embodiments, the first content server can be configured to host and/or can host a first website containing a first portion of species data, the second content server can be configured to host and/or can host a second portion of species data, the third content server can be configured to host and/or can host a first portion of qualitative data, and/or the fourth content server can be configured to host and/or can host a second portion of qualitative data.

User data server 114 may include hardware and software components that store and process data for multiple users relating to each user's activities and usage of the content delivery network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content delivery network 100. For example, the administrator server 116 may monitor device status and performance for the various servers, databases, and/or user devices 106 in the content delivery network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content delivery network 100 may include one or more communication networks 120. Although only a single network 120 is identified in FIG. 1, the content delivery network 100 may include any number of different communication networks between any of the computer servers and devices shown in FIG. 1 and/or other devices described herein. Communication networks 120 may enable communication between the various computing devices, servers, and other components of the content delivery network 100.

As discussed below, various implementations of data extraction and analysis systems 100 may employ different types of networks 120, for example, computer networks, telecommunications networks, wireless networks, and/or any combination of these and/or other networks.

In some embodiments, some of the components of the content delivery network 100 can belong to the content network 122. The content network 122 can include, for example, the content management server 102, the database server 104, the privacy server 108, the content server 112, the user data server 114, the administrator server 116, and/or the communication network 120. The content network 122 can be the source of content distributed by the content delivery network 100, which content can include, for example, one or several documents and/or applications or programs. These documents and/or applications or programs are digital content. In some embodiments, these one or several documents and/or applications or programs can include, for example, one or several webpages, presentations, papers, videos, charts, graphs, books, written work, figures, images, graphics, recordings, applets, scripts, or the like.

As used herein, an "evaluation" refers to the result of an analysis of one or several pieces of data and/or groups of data that includes both a characterization and an explanation of the characterization. As used herein, a "relative ranking" refers to the identification of the relative quality of one or several of the one or several pieces of data and/or groups of data as compared to each other. As used herein, a "characterization" refers to an indicator of the result of the evaluation. This indicator can be a numeric value, an alphabetic character, an alphanumeric character, any other symbol, or the like.

As used herein, the "explanation of the characterization" can identify one or several factors leading to the characterization. These factors can be identified in analysis criteria that identify one or several analysis parameters, the degree to which they are triggered, and/or the frequency with which they are triggered in the one or several pieces of data and/or groups of data determine a parameter value. In some embodiments, the aggregate of the parameter values of analysis criteria determines the characterization of the one or several pieces of data and/or groups of data. The analysis parameters can, in some embodiments, describe one or several attributes of the one or several pieces of data and/or data groups. In some embodiments, these one or several of these attributes can be computer detectable. In some embodiments, the degree to which the attributes occur, and/or the frequency with which they occur influences the degree to which, and/or the frequency with which the analysis parameters are triggered, and thereby influences the parameter value.

In some embodiments, the analysis criteria can be unique and/or specific to each processing task comprising a plurality of pieces of data and/or groups of data, and in some embodiments, the analysis criteria can be non-unique to each processing task. The analysis criteria can be stored in memory of the content delivery network 100 such as, for example, the server 102 and/or the database server 104. In some embodiments, the analysis criteria can be received from the content server 112; in some embodiments, the analysis criteria can be received from a user device 106 connected with the server 102; and, in some embodiments, the analysis criteria can be directly input into the server 102.

In some embodiments, the analysis criteria can be applied according to an analysis guideline. In some embodiments, the analysis guideline identifies one or several rules for application of the analysis criteria. The analysis guideline can increase the uniformity across evaluations. In some embodiments, the analysis guideline can be unique and/or specific to each processing task comprising a plurality of pieces of data and/or groups of data, and in some embodiments, the analysis guideline can be non-unique to each processing task. The analysis guideline can be stored in the memory of the content delivery network 100 such as, for example, the server 102 and/or the database server 104. In some embodiments, the analysis guideline can be received from the content server 112; in some embodiments, the analysis guideline can be received from a user device 106 connected with the server 102; and, in some embodiments, the analysis guideline can be directly input into the server 102.

Figure 2:
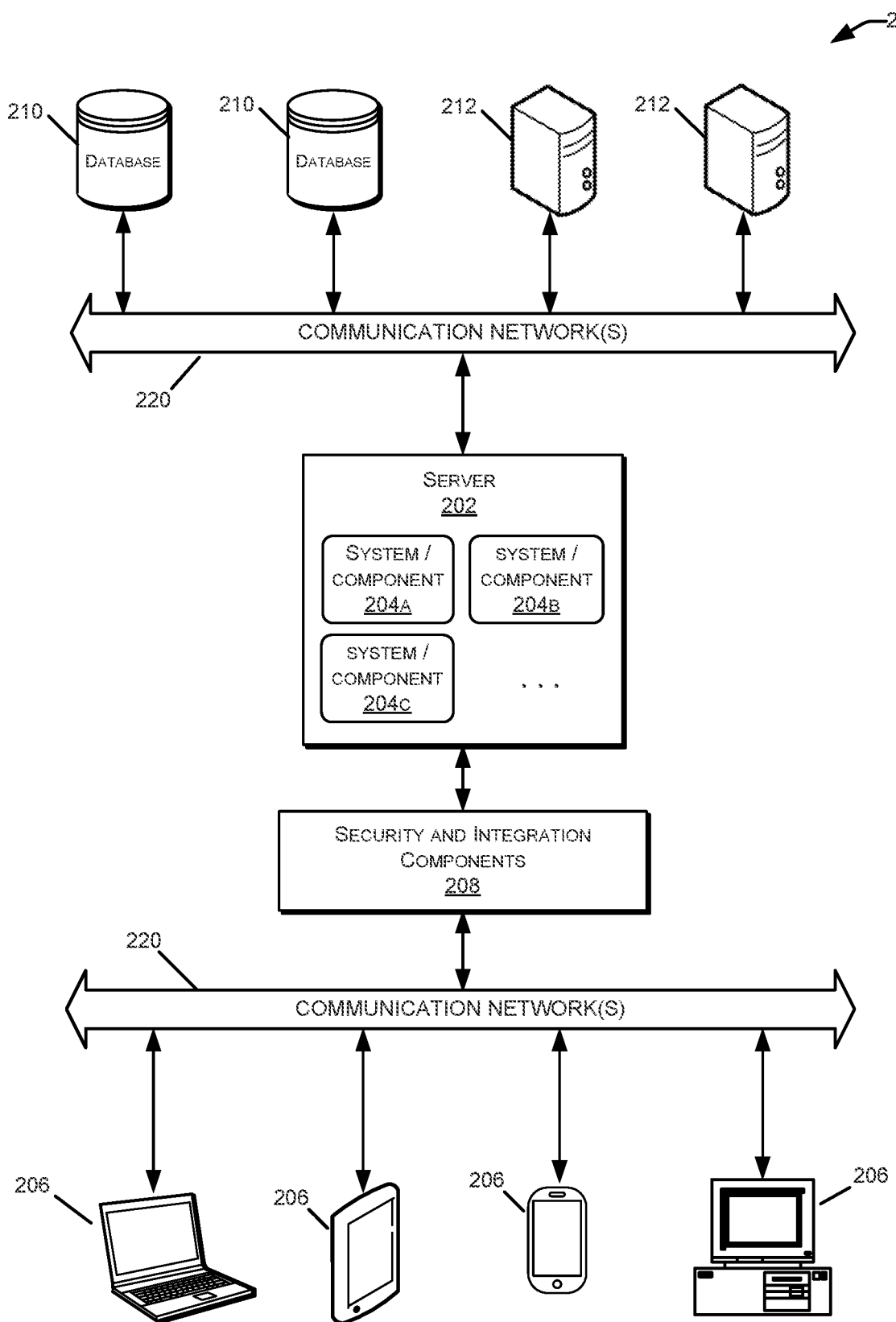
FIG. 2 is a block diagram illustrating a computer server and computing environment within a data extraction and analysis system.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and data extraction and analysis systems 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content delivery network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content delivery network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML, encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN). In some embodiments, the computing environment can be replicated for each of the networks 122 and 104 discussed with respect to FIG. 1 above.

Figure 3:
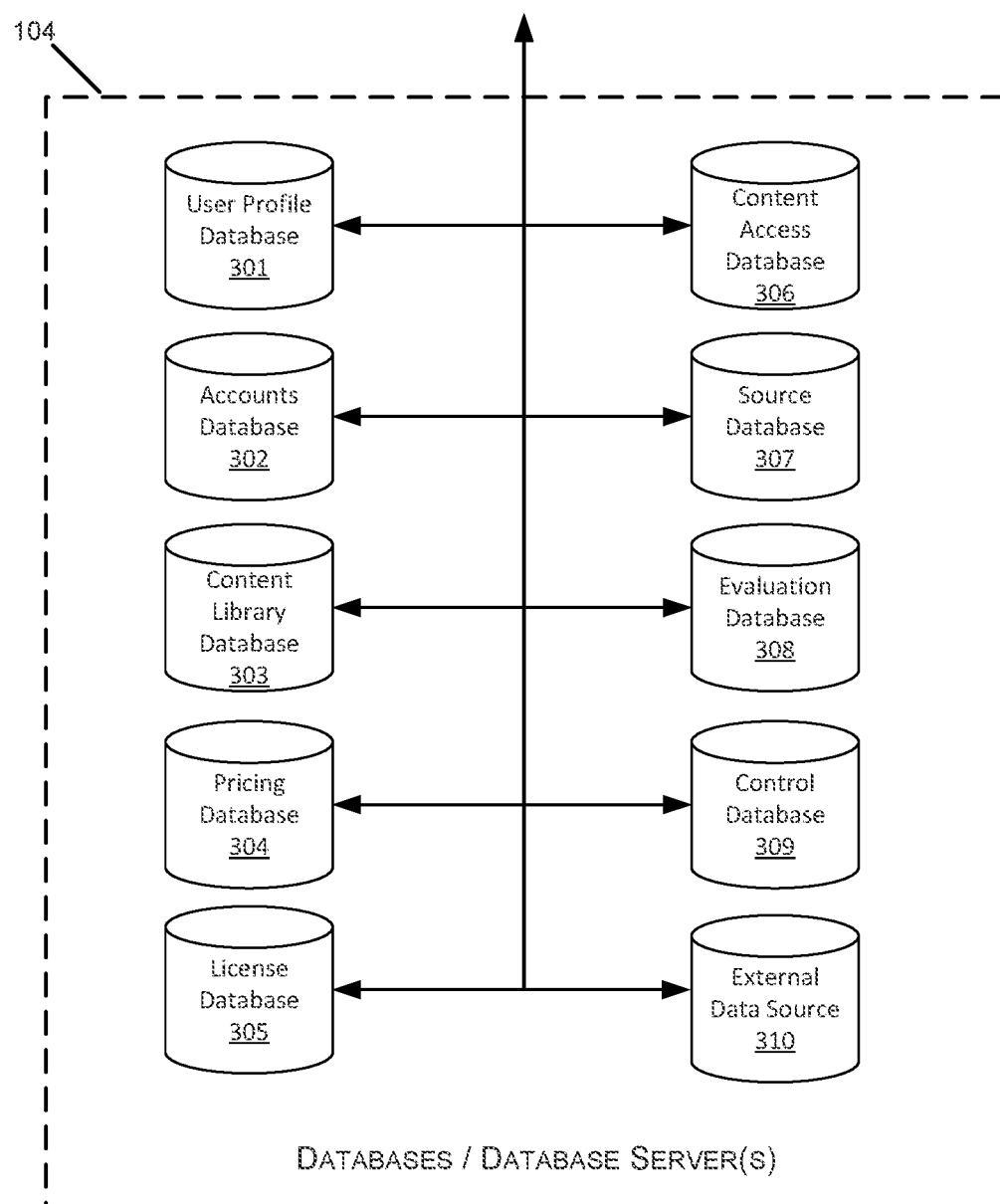
FIG. 3 is a block diagram illustrating an embodiment of one or more database servers within a data extraction and analysis system.

With reference to FIG. 3, an illustrative set of databases and/or database servers is shown, corresponding to the databases servers 104 of the content delivery network 100 discussed above in FIG. 1. One or more individual databases 301-310 may reside in storage on a single computer server 104 (or a single server farm or cluster) under the control of a single entity, or may reside on separate servers operated by different entities and/or at remote locations. In some embodiments, databases 301-310 may be accessed by the content management server 102 and/or other devices and servers within the network 100 (e.g., user devices 106, supervisor devices 110, administrator servers 116, etc.). Access to one or more of the databases 301-310 may be limited or denied based on the processes, user credentials, and/or devices attempting to interact with the database.

The paragraphs below describe examples of specific databases that may be implemented within some embodiments of a content delivery network 100. It should be understood that the below descriptions of databases 301-310, including their functionality and types of data stored therein, are illustrative and non-limiting. Database server architecture, design, and the execution of specific databases 301-310 may depend on the context, size, and functional requirements of a content delivery network 100. For example, in content distribution systems 100 used for professional training and educational purposes, separate databases may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile database 301 may include information relating to the end users within the content delivery network 100. Generally speaking the user profile database 301 can be a database having restrictions on access, which restrictions can relate to whether one or several users or categories of users are enabled to perform one or several actions on the database or on data stored in the database. In some embodiments, the user profile database 301 can include any information for which access is restricted. This information may include user characteristics such as the user names, access credentials (e.g., logins and passwords), user preferences, and information relating to any previous user interactions within the content delivery network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts database 302 may generate and store account data for different users in various roles within the content delivery network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library database 303 may include information describing the individual content items (or content resources) available via the content delivery network 100. In some embodiments, the library database 303 may include metadata, properties, and other characteristics associated with the content resources stored in the content server 112. In some embodiments, this data can include the one or several items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the content library database 303 can include a plurality of content items for presentation in one or several validations. These content items, also referred to herein as questions, can be any desired type of question including, for example, multiple choice questions, true/false questions, essay questions, short-answer questions, oral questions, demonstration questions, or the like. Some or all of the content items can be associated with data that can be used in sorting the content items, in selecting one or several content items, and/or in the evaluation of one or several content items. This data can include, for example, data identifying topics relevant to the content items. These topics can identify, for example, competencies demonstrated by the student in correctly responding to and/or answering the questions, and/or potentially lacking competencies demonstrated by the student in incorrectly responding to and/or answering the content items. In some embodiments, a content item can be associated with a single topic, and in some embodiments, a content item can be associated with multiple topics. Thus, in some embodiments, the correct answering of a single content item may be indicative of a number of competencies, and the incorrect answering of a single content item may be indicative of a number of incompetencies. In some embodiments, the content library database 303 can further include a database of topics. This database of topics can include some or all of the topics associated with content items. In some embodiments, the content library database 303 can be configured such that content items associated with a topic can be provided in response to a query for the same, and likewise such that topics associated with a content item can be provided in response to a query for the same.

In some embodiments, the data in the content library database 303 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources. In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several tests, one or several quizzes, one or several assignments, or the like. All or portions of the content library database can be stored in a tier of memory that is not the fastest memory in the content delivery network 100.

A pricing database 304 may include pricing information and/or pricing structures for determining payment amounts for providing access to the content delivery network 100 and/or the individual content resources within the network 100. In some cases, pricing may be determined based on a user's access to the content delivery network 100, for example, a time-based subscription fee, or pricing based on network usage, or the like. In other cases, pricing may be tied to specific content resources. Certain content resources may have associated pricing information, whereas other pricing determinations may be based on the resources accessed, the profiles and/or accounts of the users and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content delivery network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content delivery network 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source database 307 can comprise information relating to the source of some or all of the one or several pieces of data and/or groups of data including, for example, the one or several originating devices. In some embodiments, the source database 307 can include information identifying the originating device and/or the user of the originating device, the author of some or all of the one or several pieces of data and/or data groups, previous pieces of data and/or groups of data originating from the originating device and/or the author, or the like. In some embodiments, the information stored in the source database can be received via the content server 112.

An evaluation database 308 can include information used to direct the evaluation of the pieces of data and/or groups of data. In some embodiments, the evaluation database 308 can contain, for example, the analysis criteria and the analysis guideline. This information can be received from the content server 112, and ultimately from one or several originating devices.

The evaluation database 308 can further include information relating to one or several processing tasks. This information can include, for example, the identification of independent processing units 113 that have received one or several pieces of data and/or groups of data for evaluation, the status of the evaluation of one or several pieces of data and/or data groups that have been received by an independent processing unit 113, an accuracy parameter for one or several of the independent processing units 113, an evaluation history for the one or several independent processing units 113, or the like. In some embodiments, the evaluation criteria can comprise data and/or instructions in the form of one or several electronic rubrics or scoring guides for use in the evaluation of the one or several pieces of data and/or data groups. The information stored within the evaluation database 308 can be generated within the distributed processing system 100, and, in some embodiments, this information can be provided to the distributed processing system 100.

In some embodiments, the evaluation database 308 can include one or several evaluations for one or several pieces of data and/or groups of data. In some embodiments, these evaluations can include a relative ranking, a characterization, and/or an explanation of the characterization and/or relative ranking.

The distributed processing system 100 can include a control database 309. The control database 309 can include information used in the management of the one or several independent processing units 113. In some embodiments, this can, for example, include information used in evaluating the quality of the evaluations of the independent processing units 113, information and/or computer code for generating an accuracy parameter, one or several pieces of learning data and/or learning groups of data that can provide one or several external stimuli to facilitate learning of the analysis engine 254, or the like. In some embodiments, these one or several pieces of learning data and/or learning groups of data can comprise training materials that are associated with a known characterization and, in some embodiments, can exhibit certain traits and/or contain certain predetermined material. This training material can allow the determination of the quality of the evaluations provided by the one or several independent processing units 113, and particularly provided by the analysis modules 204 of the one or several independent processing units 113.

In addition to the illustrative databases described above, database server(s) 104 may include one or more external data aggregators 310. External data aggregators 310 may include third-party data sources accessible to the content management network 100, but not maintained by the content management network 100. External data aggregators 310 may include any electronic information source relating to the users, content resources, or applications of the content delivery network 100. For example, external data aggregators 310 may be third-party databases containing demographic data, education related data, consumer sales data, health related data, and the like. Illustrative external data aggregators 310 may include, for example, social networking web servers, public records databases, learning management systems, educational institution servers, business servers, consumer sales databases, medical record databases, etc. Data retrieved from various external data aggregators 310 may be used to verify and update user account information, suggest user content, and perform user and content evaluations.

Figure 4:
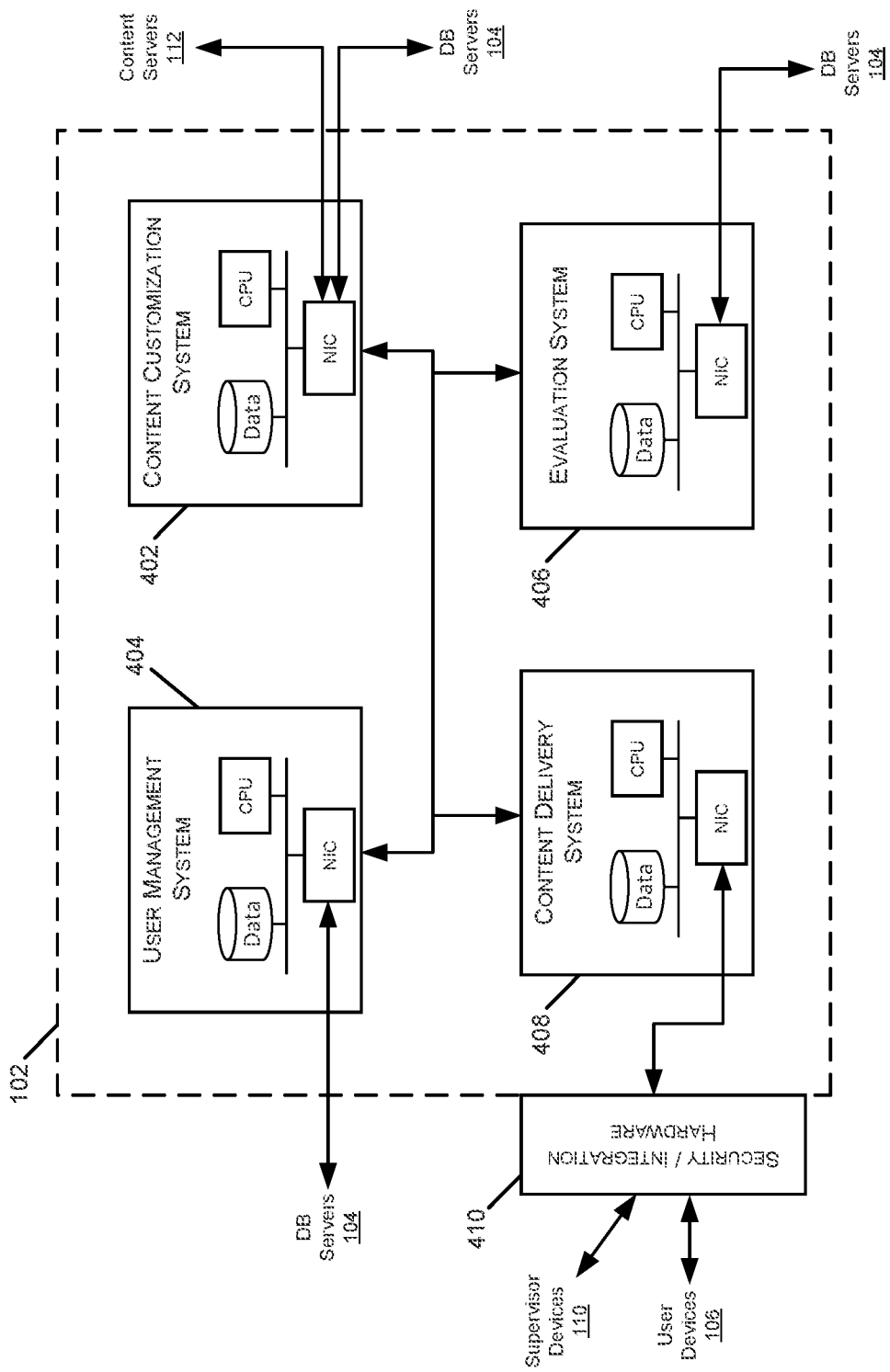
FIG. 4 is a block diagram illustrating an embodiment of one or more content management servers within a data extraction and analysis system.

With reference now to FIG. 4, a block diagram is shown illustrating an embodiment of one or more content management servers 102 within a content delivery network 100. As discussed above, content management server(s) 102 may include various server hardware and software components that manage the content resources within the content delivery network 100 and provide interactive and adaptive content to users on various user devices 106. For example, content management server(s) 102 may provide instructions to and receive information from the other devices within the content delivery network 100, in order to manage and transmit content resources, user data, and server or client applications executing within the network 100.

A content management server 102 may include a content customization system 402. The content customization system 402 may be implemented using dedicated hardware within the content delivery network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), and the like. Based on the retrieved information from databases 104 and other data sources, the content customization system 402 may modify content resources for individual users.

A content management server 102 also may include a user management system 404. The user management system 404 may be implemented using dedicated hardware within the content delivery network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the content delivery network 100 (e.g., an evaluation server 406), or using designated hardware and software resources within a shared content management server 102. The evaluation system 406 may be configured to receive and analyze information from user devices 106 via, for example, the privacy server 108. For example, various ratings of content resources submitted by users may be compiled and analyzed, and then stored in a database (e.g., a content library database 303) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content delivery network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
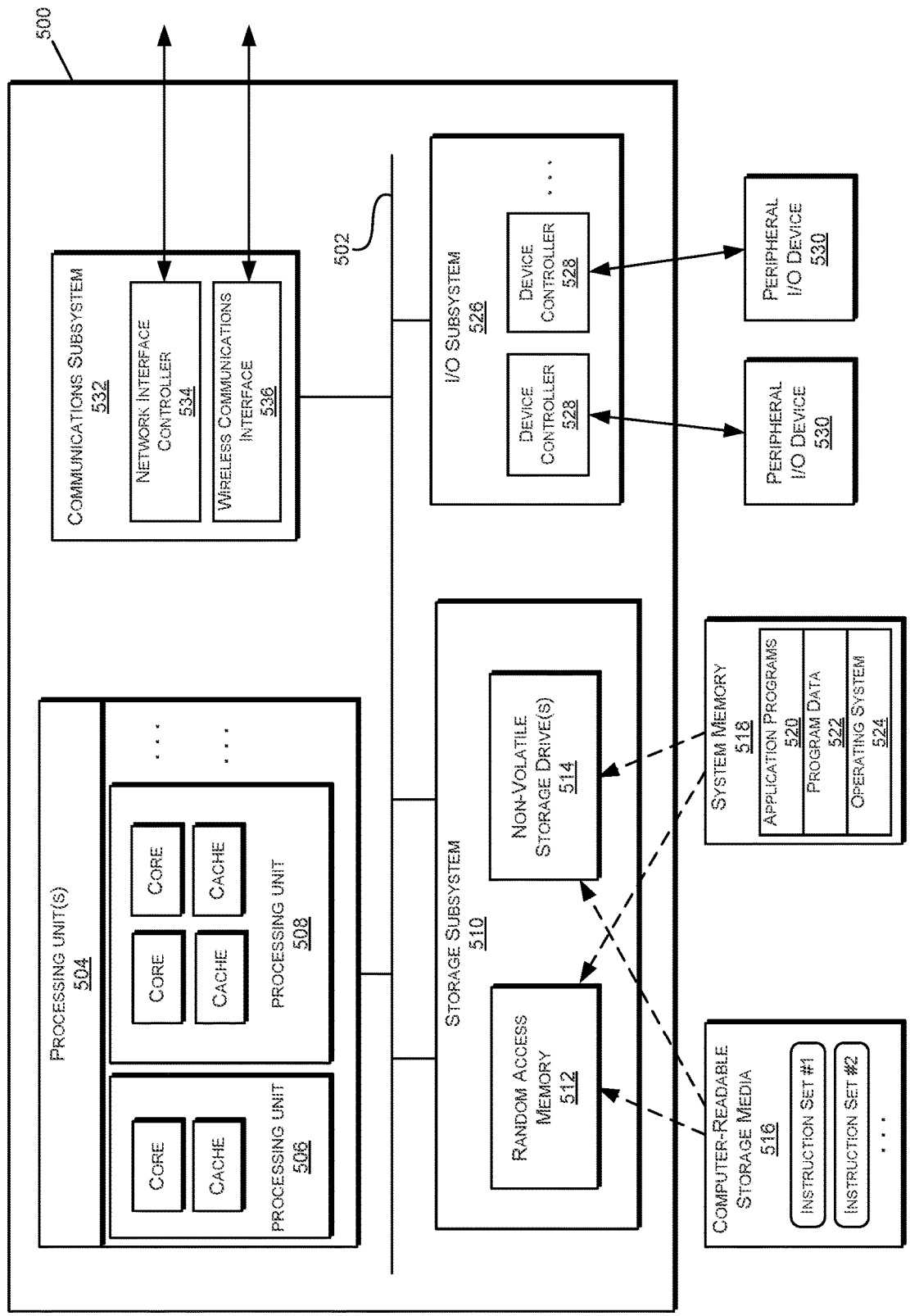
FIG. 5 is a block diagram illustrating the physical and logical components of a special-purpose computer device within a data extraction and analysis system.

With reference now to FIG. 5, a block diagram of an illustrative computer system is shown. The system 500 may correspond to any of the computing devices or servers of the content delivery network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 510 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
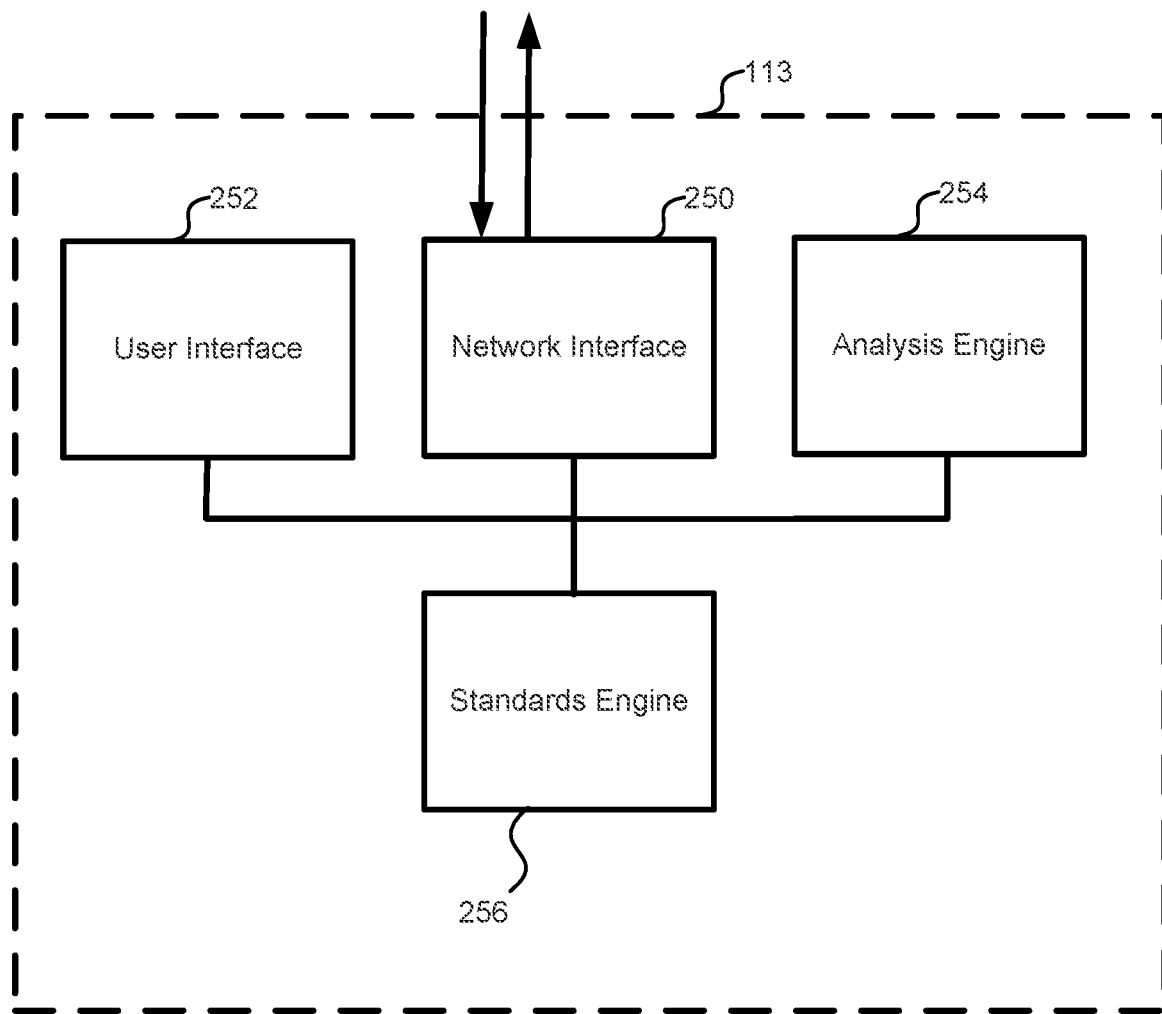
FIG. 6 is a schematic illustration of one embodiment of an independent processing unit of a distributed processing system.

With reference now to FIG. 6, a schematic illustration of one embodiment of the independent processing unit 113 is shown. As discussed above, the independent processing unit 113 can be configured to provide information to and/or receive information from other components of the distributed processing system 100. The independent processing unit 113 can access the distributed processing system 100 through any desired means or technology, including, for example, a webpage, a web portal, or via network 120. As depicted in FIG. 6, the independent processing unit 113 can include a network interface 250. The network interface 250 allows the independent processing unit 113 to access the other components of the distributed processing system 100, and specifically allows the independent processing unit 113 to access the network 120 of the distributed processing system 100. The network interface 250 can include one or several features configured to send and receive information, including, for example, an antenna, a modem, a transmitter, receiver, or any other feature that can send and receive information. The network interface 250 can communicate via telephone, cable, fiber-optic, or any other wired communication network. In some embodiments, the network interface 250 can communicate via cellular networks, WLAN networks, or any other wireless network.

The independent processing unit 113 can include a user interface 252 that communicates information to, and receives inputs from a user. The user interface 252 can include a screen having one or several pixels, a speaker, a monitor, a keyboard, a microphone, a mouse, a touchpad, a keypad, or any other feature or features that can receive inputs from a user and provide information to a user. In some embodiments, the pixels of the screen can be controlled to provide information to the user of the independent processing unit 113. In some embodiments, the user interface 252 can allow the user to provide one or several inputs to the independent processing unit 113 that are relevant to the other components of the distributed processing system 100 discussed herein.

The independent processing unit 113 can include an analysis engine 254. In some embodiments, the analysis engine 254 can be configured to receive one or several pieces of data and/or groups of data from the server 102, and/or from the database 104. In some embodiments, the analysis engine 254 can be an embodiment in hardware or software that can be configured to retrieve the analysis criteria and the analysis guideline. In some embodiments, the analysis engine 254 can be configured to learn and adapt based on external stimulus, and particularly based on the one or several of the pieces of data or data groups previously evaluated by the analysis engine 254. In some embodiments, the analysis engine can be configured to generate a user interface that can facilitate the human review of the one or several pieces of data and/or data groups.

The analysis engine 254 can generate the evaluation according to the analysis criteria and the analysis guideline. In such an embodiment, the analysis module 254 can identify one or several analysis parameters of the analysis criteria, can determine the degree to which the attributes associated with the analysis parameters occur, and/or the frequency with which the attributes occur in the one or several pieces of data and/or groups of data. These attributes can relate to, for example, word usage, vocabulary, spelling, grammar, content, citations, use of citations, or the like. In one embodiment, for example, these criteria can include the number and/or frequency of misspellings, the number and/or frequency of grammar errors, the level of vocabulary of the one or several pieces of data and/or data groups, the correctness and/or level of word usage, the coherency, accuracy, and/or relevancy of the pieces of data and/or data groups, or the like.

The independent processing unit 113 can include a standards engine 256, also referred to herein as a standards module. The standards engine 256 can be embodied in hardware or software. In some embodiments, the standards engine 256 can be configured to receive and store the analysis criteria and the analysis guideline. In some embodiments, the standards engine 256 can receive the analysis criteria and the analysis guideline from another component of the distributed processing system 100 such as, for example, the server 102 and/or the database server 106. The standards engine 256 can be further configured to maintain the operation of the analysis module 254 in accordance with the analysis criteria and the analysis guideline. In some embodiments, the standards engine 256 can be configured to convert all or portions of the analysis criteria and/or analysis guidelines to visual format and to control the user interface 252 to display these. In some embodiments, the standards engine 256 can be configured to convert the analysis criteria and/or analysis guideline from the form in which they were provided to the distributed processing system 100 to one or several lines of computer code that can control the operation of the analysis engine 254.

Figure 7:
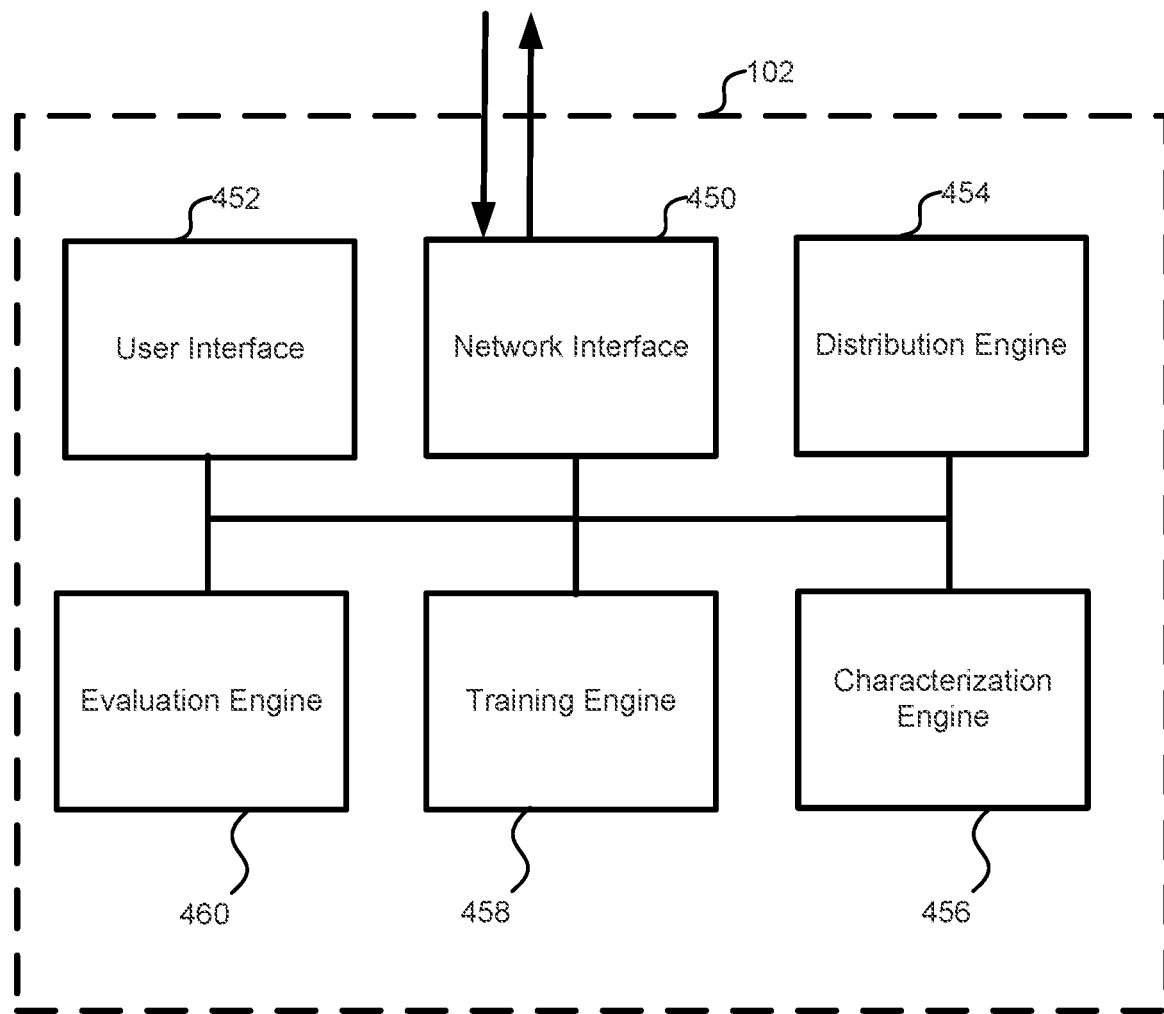
FIG. 7 is a schematic illustration of one embodiment of the server of one embodiment of a distributed processing system.

With reference now to FIG. 7, a schematic illustration of one embodiment of the server 102 is shown. The server 102 includes a network interface 450. The network interface 450 allows the server 102 to access the other components of the distributed processing system 100, and specifically allows the server 102 to access the network 120 of the distributed processing system 100. The server 102 can include features configured to send and receive information, including, for example, an antenna, a modem, a transmitter, receiver, or any other feature that can send and receive information. The network interface 450 can communicate via telephone, cable, fiber-optic, or any other wired communication network. In some embodiments, the network interface 450 can communicate via cellular networks, WLAN networks, or any other wireless network.

The server 102 can include a user interface 452 that communicates information to, and receives inputs from a user. The user interface 452 can include a screen having one or several pixels, a speaker, a monitor, a keyboard, a microphone, a mouse, a touchpad, a keypad, or any other feature or features that can receive inputs from a user and provide information to a user. In some embodiments, the pixels of the screen can be controlled to provide information to the user of the server 102. In some embodiments, the user interface 452 can allow the user to provide one or several inputs to the server that are relevant to the other components of the distributed processing system 100 discussed herein.

The server 102 can include a distribution engine 454. The distribution engine 454 can be configured to manage the distribution of the processing task(s) to the one or several independent processing units 113. In one embodiment, the distribution engine can be configured to receive a processing task comprising one or several pieces of data and/or data groups from the content server 112, to identify information relating to the desired completion of the processing task. In some embodiments, this information can be stored within the analysis guideline, and can, for example, specify a number of evaluations for completion of the processing task, a number of repeated evaluations for completion of the processing task, one or several attributes of independent processing units 113 that can be used for completion of the processing task, which can include, for example, a language capability, a subject matter competency level, a training and/or learning level, or the like. In some embodiments, the distribution engine 454 can receive information relating to one or several of the independent processing units 113 and can select a set of the independent processing units 113 for use in completion of the processing task.

The distribution engine 454 can be further configured to monitor the progress of the processing task, and can, for example, identify problems in the completion of the processing task, generate commands and control portions of the distributed processing system 100 to achieve one or several deadlines or to comply with one or several timelines, or the like.

The server 102 can include a characterization engine 456. The characterization engine 456 can be configured to receive one or several evaluations from the independent processing units 113 and to generate a characterization for some or all of the pieces of data and/or groups of data included in the processing task. In some embodiments, the characterization engine 456 can be configured to receive an accuracy parameter for some or all of the independent processing units 113 that has generated an evaluation and to use this accuracy parameter, in connection with the initial characterization contained in the evaluation to generate a final characterization. In some embodiments, this can include, for example, retrieving relative ranking information from the evaluation of the one or several pieces of data and/or data groups, generating a ranking for the pieces of data and/or groups of data in the processing task, and assigning one or several characterizations based on the ranking for the pieces of data and/or groups of data in the processing task. The characterization engine 456 can be further configured to identify a discrepancy between the initial characterization of the independent processing units 113 and the final characterization. This discrepancy can be compared, directly or indirectly, to the accuracy parameter of the independent processing unit 113 that is the source of the initial evaluation, and this discrepancy can be used to update the accuracy parameter of that independent processing unit 113.

The server 102 can include a training engine 458. The training engine 458 can be configured to generate and/or provide material to one or several independent processing units 113 to improve evaluations provided by the independent processing unit 113. In some embodiments, the training material can be configured to be used by the analysis engine 254 for machine learning by the analysis engine 254. In some embodiments, the training material can be transmitted by the analysis engine 254 to a user of the independent processing unit 113 to facilitate in training the user of the independent processing unit 113. The training engine 458 can be further configured to track training received by one or several of the independent processing units 113 and to generate a training plan based on, for example, the accuracy parameter, past received training, or the like.

In some embodiments, the server 102 can include an evaluation engine 460. In some embodiments, the evaluation engine 460 can be configured to receive one or several pieces of data and/or groups of data from the content server 112 and/or from the database 104. In some embodiments, the evaluation engine 460 can be embodiment in hardware or software that can be configured to retrieve the analysis criteria and the analysis guideline. In some embodiments, the analysis engine can be configured to generate a user interface that can facilitate the human review of the one or several pieces of data and/or data groups. In contrast to the analysis engine 254, the evaluation engine 460, in some embodiments, is not configured to learn and adapt based on external stimulus, and particularly based on the one or several of the pieces of data or data groups previously evaluated by the evaluation engine 460.

The evaluation engine 460 can generate the evaluation according to the analysis criteria and the analysis guideline. In such an embodiment, the evaluation engine 460 can identify one or several analysis parameters of the analysis criteria, and can determine the degree to which the attributes associated with the analysis parameters occur, and/or the frequency with which the attributes occur in the one or several pieces of data and/or groups of data. These attributes can relate to, for example, word usage, vocabulary, spelling, grammar, content, citations, use of citations, or the like. In one embodiment, for example, these criteria can include the number and/or frequency of misspellings, the number and/or frequency of grammar errors, the level of vocabulary of the one or several pieces of data and/or data groups, the correctness and/or level of word usage, the coherency, accuracy, and/or relevancy of the pieces of data and/or data groups, or the like.

Figure 8:
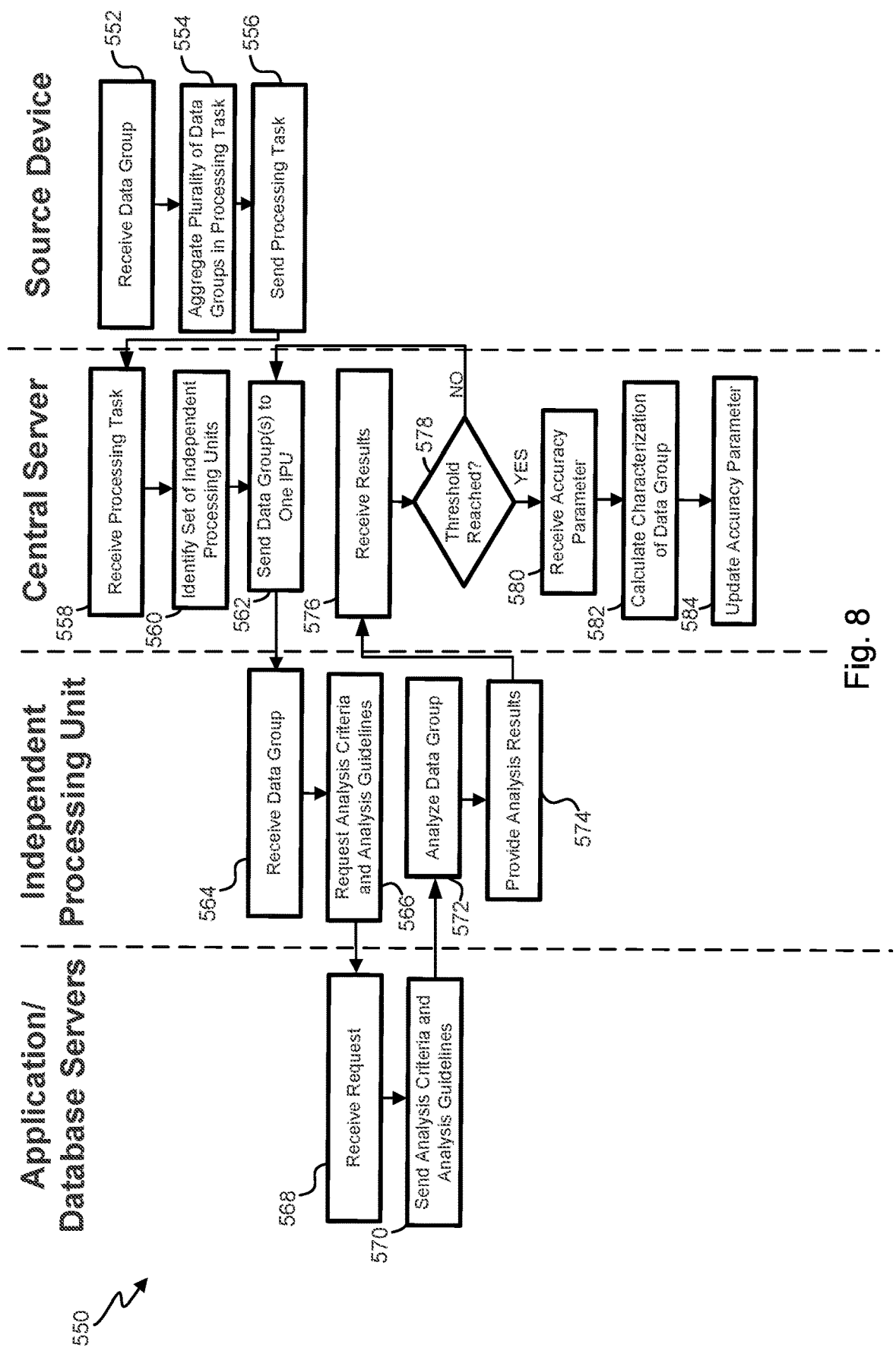
FIG. 8 is a swim-lane diagram illustrating one embodiment of a process for increasing the efficiency and processing speed of distributed computing.

With reference now to FIG. 8, a swim-lane diagram illustrating one embodiment of a process 550 for increasing the efficiency and processing speed of distributed computing is shown. The headers of the swim lanes identify components of the distributed processing system 100 that can perform the indicated step.

The process 550 begins in block 552 wherein the content server 112 receives one or several pieces of data and/or data groups. In some embodiments, these can be received from the one or several originating devices. After the content server 112 receives the one or several pieces of data and/or data groups, the process 550 proceeds to block 554, wherein the one or several pieces of data and/or data groups are aggregated into a processing task. In some embodiments, this aggregation can be performed according to information that is received with one or several of the one or several pieces of data and/or data groups. This information can identify a common aspect of the one or several pieces of data and/or data groups such as, for example, a type of the one or several pieces of data and/or data groups. This information relating to the common aspect of the one or several pieces of data and/or data groups can be used to compile the one or several pieces of data and/or data groups into the processing task. In some embodiments, and as a part of the aggregation of the processing task, the content server 112 can receive and/or retrieve the analysis criteria and analysis guideline relevant to the one or several pieces of data and/or groups of data forming the processing task. In some embodiments, these can be aggregated into the processing task with the one or several pieces of data and/or groups of data. In other embodiments, however, the analysis criteria and analysis guideline are received and/or retrieved at a later point in process 550.

After the processing task has been aggregated, the process 550 proceeds to block 556, wherein the processing task is sent, from the content server 112 to the server 102. In some embodiments, the sending of the processing task includes any method or technique of moving the processing task from the content server 112 to the server 102. In some embodiments, this sending of the processing task can be according to a push-model, and in some embodiments, this sending can be according to a pull-model. After the processing task has been sent, the process 550 proceeds to block 558, wherein the server 102 receives the processing task. In some embodiments, the server 102 can receive the processing task via the network 120 and the network interface 450 of the server 102.

After the processing task has been received by the server 102, the process 550 proceeds to block 560, wherein a set of independent processing units 113 is identified. In some embodiments, this set of independent processing units can be identified by evaluating the information received from the content server 112, including, for example, the analysis criteria and analysis guideline. In some embodiments, this set can be identified based on the size of the processing task, based on any deadlines and/or timelines for completion of the processing task, or the like.

After the set of independent processing units has been identified, the process 550 proceeds to block 562, wherein the processing task is separated into separate pieces of data and/or groups of data, or into groups of pieces of data and/or groups of data. In some embodiments, the server 102 can then generate a signal corresponding to the separate pieces of data and/or groups of data, or groups of pieces of data and/or groups of data, and can, via signal, send the separate pieces of data and/or groups of data, or into groups of pieces of data and/or groups of data to one or several of the independent processing units 113 in the set of independent processing units. In some embodiments, this includes any method or technique of moving the data from the server 102 to one or several of the independent processing units 113. In some embodiments, this can include sending data according to a push-model, and in some embodiments, this can include sending data according to a pull-model.

After the data has been sent, the process 550 proceeds to block 564, wherein the sent data is received by one of the independent processing units 113. This data can be received by the independent processing unit 113 via the network 120 and via the network interface 250. After the data has been received, the process 550 proceeds to block 566, wherein the analysis criteria and/or analysis guideline are requested. In some embodiments in which the content server 112 received the analysis criteria and/or analysis guideline, the independent processing unit 113 can request these from the content server 112. Alternatively, in some embodiments in which the content server 112 received the analysis criteria and/or analysis guideline, these can be passed to the server 102 as part of the processing task, and the server 102 can distribute these to the individual ones of the processing units 113.

In the embodiment depicted in FIG. 8, the analysis criteria and/or analysis guideline are contained in the database 104, and the independent processing unit 113 can request these from the database 104. In some embodiments, this can include the generation of an electronic query by the independent processing unit 113, which query is sent to the database 104. After the database 104 receives the request for the analysis criteria and/or analysis guideline at block 568, the process 550 proceeds to block 570, wherein the analysis criteria and/or analysis guideline are sent to the independent processing unit 113. In some embodiments, this can include the generation of an electrical signal, which is sent from the database 104, or the hardware housing to the database 104 to the independent processing unit 113. In some embodiments, step 570 can include the receipt of the analysis criteria and/or analysis guideline by the independent processing unit 113.

After the analysis criteria and/or analysis guideline have been sent to the independent processing unit 113, the process 550 proceeds to block 572, wherein the pieces of data and/or groups of data, and/or groups of pieces of data received by the independent processing unit 113 at block 564 are analyzed. In some embodiments, this analysis can be performed by, at, and/or with the independent processing unit, and specifically, by or with the analysis engine 254. In some embodiments, this can include updating of the analysis engine 254 with the analysis criteria and analysis guideline and the use of the analysis criteria and analysis guideline to analyze the data. This can include, for example, an objective analysis, a subject analysis, a substantive analysis, a contextual analysis, or the like. The details of some embodiments of this analysis will be discussed at greater lengths below.

After the data has been analyzed, the process 550 proceeds to block 574, wherein the analysis result is provided, by the independent processing unit 113 to the server 102. After the analysis result is provided, the process 550 proceeds to block 576, wherein the analysis results are received by the server 102. In some embodiments, the results can be received via one or several electric signals.

After the results have been received, the process 550 proceeds to decision state 578, wherein it is determined if a threshold has been reached. In some embodiments, this threshold can identify the minimum number of evaluations to be performed to complete the processing task. This threshold can, in some embodiments, be specified in the analysis guideline. In some embodiments, the server 102 can track the number of evaluations that have been performed. In one embodiment, this can be done by incrementing a value when data is sent for evaluation and/or when analysis results are received. In some embodiments, this value can then identify the number of evaluations performed for a processing task, but can also include information such as, for example, the number of times some or all of the one or several pieces of data and/or groups of data have been evaluated, which independent processing units 113 evaluated which of the one or several pieces of data and/or groups of data, or the like.

If it is determined that the threshold has not been reached, then the process 550 returns to block 562, and proceeds as outlined above. If it is determined that the threshold has been reached, the process 550 proceeds to block 580, wherein the accuracy parameter is received. In some embodiments, the accuracy parameter can be received from the independent processing unit 113 at the time that the analysis results are received; in some embodiments, the accuracy parameter can be received and/or retrieved from the database 104, and in some embodiments, the accuracy parameter can be generated by the server 102.

After the accuracy parameter has been received, the process 550 proceeds to block 582, wherein the final characterization of some or all of the one or several pieces of data and/or data groups is calculated and/or generated. In some embodiments, this final characterization can be calculated and/or generated with the accuracy parameter, as well as with the evaluation results from one or several independent processing units 113. In embodiments in which multiple independent processing units 113 generated evaluations for a single piece of data and/or group of data, the calculation of the final characterization can include, for example, adjusting the individual characterizations according to the accuracy value, and combining the adjusted values to generate a final characterization.

After the final characterization has been calculated, the process 550 proceeds to block 584, wherein the accuracy parameter is updated. In some embodiments, this can include comparing the final characterization to some or all of the characterizations of the independent processing units 113, determining a degree of difference between the two, and generating an instance accuracy parameter based on this difference. In some embodiments, the instance accuracy parameter can be used to adjust the accuracy parameter, thus if the deviation of a characterization is greater than indicated by the accuracy parameter, the instance accuracy parameter can be combined with the accuracy parameter to update and/or adjust the accuracy parameter to better reflect this deviation. Conversely, if the deviation of a characterization is less than indicated by the accuracy parameter, the instance accuracy parameter can be combined with accuracy parameter to update and/or adjust the accuracy parameter to better reflect this deviation.

Figure 9:
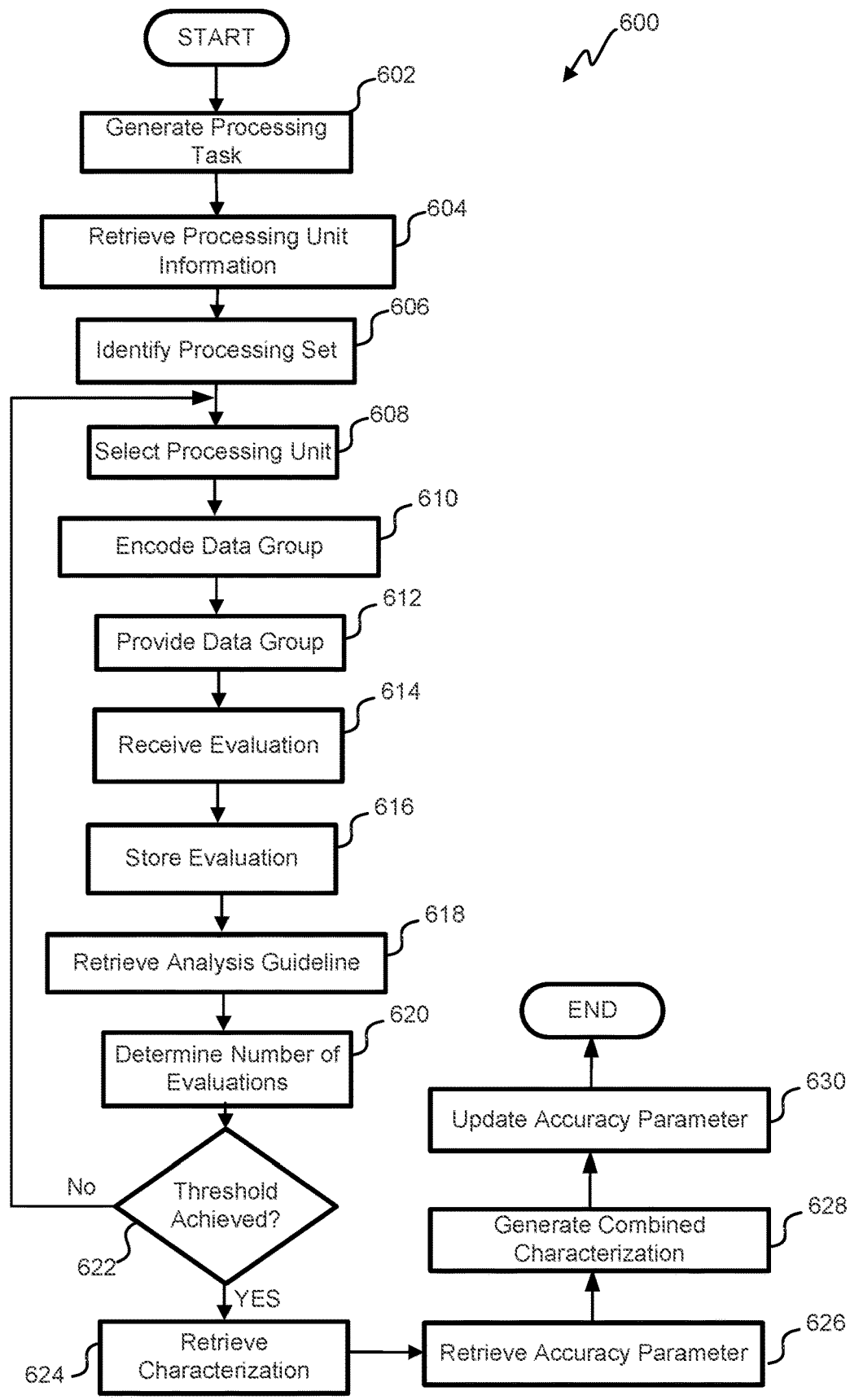
FIG. 9 is a flowchart illustrating one embodiment of a process for calculating an actual score with a distributed processing system.

With reference now to FIG. 9, a flowchart illustrating one embodiment of a process 600 for calculating an actual score is shown, which process increases the efficiency and processing speed of a distributed computing system 100. In some embodiments, the process 600 can be performed by the distributed computing system 100 and/or by a component thereof including, for example, the server 102, the independent processing unit 113, or any other component of the distributed computing system 100.

The process begins at block 602 wherein the processing task is generated and/or aggregated. In some embodiments, the processing task can be aggregated at the content server 112, and in some embodiments, the processing task can be aggregated at the server 102. In some embodiments, the aggregation of the processing task can include the combination of one or several pieces of data and/or groups of data.

After the processing task has been generated, the process 600 proceeds to block 604 wherein independent processing unit information is retrieved and/or received. In some embodiments, this information can identify one or several attributes of one or several independent processing units including, for example, one or several attributes of the analysis engine 254 and/or the user of the analysis engine. These attributes can, for example, identify the number of evaluations provided by one or several of the independent processing units 113 including, for example, evaluations performed by the analysis engine 254, and/or evaluation performed by a user of the analysis engine 254.

After the independent processing unit information is retrieved, the process 600 proceeds to block 606 wherein the processing set is identified. In some embodiments, the processing set can comprise a plurality of independent processing units and/or users of the independent processing units. This set can be selected, in some embodiments, based on the independent processing unit information that is retrieved in block 604, the analysis criteria, and/or analysis guideline. In some embodiments, this set can be selected by the server 102 and/or by another component of the distributed processing system 100.

After the processing set has been identified, the process 600 proceeds to block 608, wherein an independent processing unit 113 is selected. In some embodiments, the selected independent processing unit 113 can be selected from the processing set. The independent processing unit can, in some embodiments, be selected based on the independent processing unit information that is retrieved in block 604, the analysis criteria, and/or analysis guideline.

After the independent processing unit 113 has been selected, the process 600 proceeds to block 610 wherein one or several pieces of data and/or data groups are encoded and/or converted into an electric signal. In some embodiments, this can occur at the server 102 and can be part of, for example, the sending of the one or several pieces of data and/or groups of data to the selected independent processing unit.

After the one or several pieces of data and/or data groups are encoded and/or converted into an electric signal, the process 600 proceeds to block 612 wherein the one or several pieces of data and/or data groups are provided. In some embodiments, this step can be performed for all of the one or several pieces of data and/or data groups of the processing task in that some or all of the one or several pieces of data and/or data groups are sent to an independent processing unit 113. In some embodiments this can result in several independent processing units receiving some of the one or several pieces of data and/or data groups.

In some embodiments, the one or several pieces of data and/or data groups are provided to the independent processing unit via, for example, the user interface 252. After the one or several pieces of data and/or data groups have been provided, the process 600 proceeds to block 614 wherein the evaluation is received. In some embodiments, the evaluation can be received from one or several of the independent processing units 113. In one embodiment, for example, in which the processing task was divided into a plurality of pieces of data and/or groups of data, and then one or several of the plurality of pieces of data and/or groups of data was provided to a plurality of independent processing units 113, the step of block 614 can include receiving the evaluation from some or all of this plurality of independent processing units 113. In some embodiments, the evaluations can be received via, for example, the network 120, and specifically via the user interface 252 of the independent processing units 113 via the network.

After the evaluation has been received, the process 600 proceeds to block 616 wherein the evaluation is stored. In some embodiments, for example, the evaluation can be stored within a portion of the distributed processing system 100 such as, for example, the database 104. In one embodiment, the evaluations can be stored in one of the databases of the database server 104 such as, for example, the evaluation database 308.

After the evaluation has been stored, the process 600 proceeds to block 618 wherein the evaluation guideline is retrieved. In some embodiments, the evaluation retrieved can be retrieved from the database 104. The evaluation guideline can include a value indicating the number of evaluations and/or the number of redundant evaluations to be received to complete the processing request. In some embodiments, a redundant evaluation can be an additional evaluation of an already evaluated piece of data and/or group of data.

After the evaluation guideline has been retrieved, the process 600 proceeds to block 620 wherein the number of completed evaluations is determined. In some embodiments, and as mentioned above, the number of completed and/or requested evaluations can be tracked by incrementing a value when data is sent for evaluation and/or when an evaluation is received. In some embodiments, this value can be specific to a processing task, and in some embodiments, this value can include a portion that is specific to a processing task, and a portion specific to some or all of the pieces of data and/or data groups of the processing task. Thus, in one embodiment, the number of times a piece of data and/or a group of data is evaluated can be tracked, as well as the total number of evaluations performed for a processing task. In some embodiments, the determination of the number of completed evaluations can include retrieving the value tracking the number of evaluations.

After the number of completed evaluations is determined, the process 600 proceeds to decision state 622 wherein it is determined if the evaluation threshold is achieved. In some embodiments, this determination can be performed by the server 102, and/or another component of the distributed processing system 100. If it is determined that the evaluation threshold has not been achieved, then the process 600 returns to block 608 and continues as outlined above.

If it is determined that the evaluation threshold has been achieved, then the process 600 proceeds to block 624 wherein characterizations are retrieved. In some embodiments, this can include retrieving the received evaluations, and separating the characterizations from the evaluations. In some embodiments, the evaluations can be retrieved from the database 104, and the characterizations can be separated from the evaluations by the server 102.

After the characterizations are retrieved, the process 600 proceeds to block 626 wherein the accuracy parameter is retrieved. In some embodiments, for example, the accuracy parameter can be retrieved from the database 104, and specifically, from one of the databases, such as, for example, the evaluation database 308 and/or the control database 309 of the database 104.

After the accuracy parameter has been retrieved, the process 600 proceeds to block 628 wherein the final characterization, also referred to herein as a combined characterization, is generated. In some embodiments, for example, the combined characterization can be calculated by the server 102 of the distributed processing system 100, and can be calculated based on the retrieved characterizations for one or several of the pieces of data and/or data groups and the accuracy parameters associated with the analysis engine 254, or user thereof, of the independent processing units 113 that provided the evaluation. In some embodiments, some or all of the pieces of data and/or data groups of the processing task can have characterizations, and a final characterization based on the characterizations and the accuracy parameters associated with the analysis engine 254, or user thereof, of the independent processing units 113 that provided the evaluation.

After the actual score has been calculated, the process 600 proceeds to block 630 wherein the accuracy parameter is updated. In some embodiments, for example, the updating accuracy parameter can include the comparison of the characterization and the final characterization, the determination of the degree of deviation between the characterization and the final characterization, a determination of the update and/or augmentation to be provided to the accuracy parameter to reflect the degree of discrepancy between the characterization and the final characterization, and a change of the accuracy parameter based on the update and/or augmentation.

Figure 10:
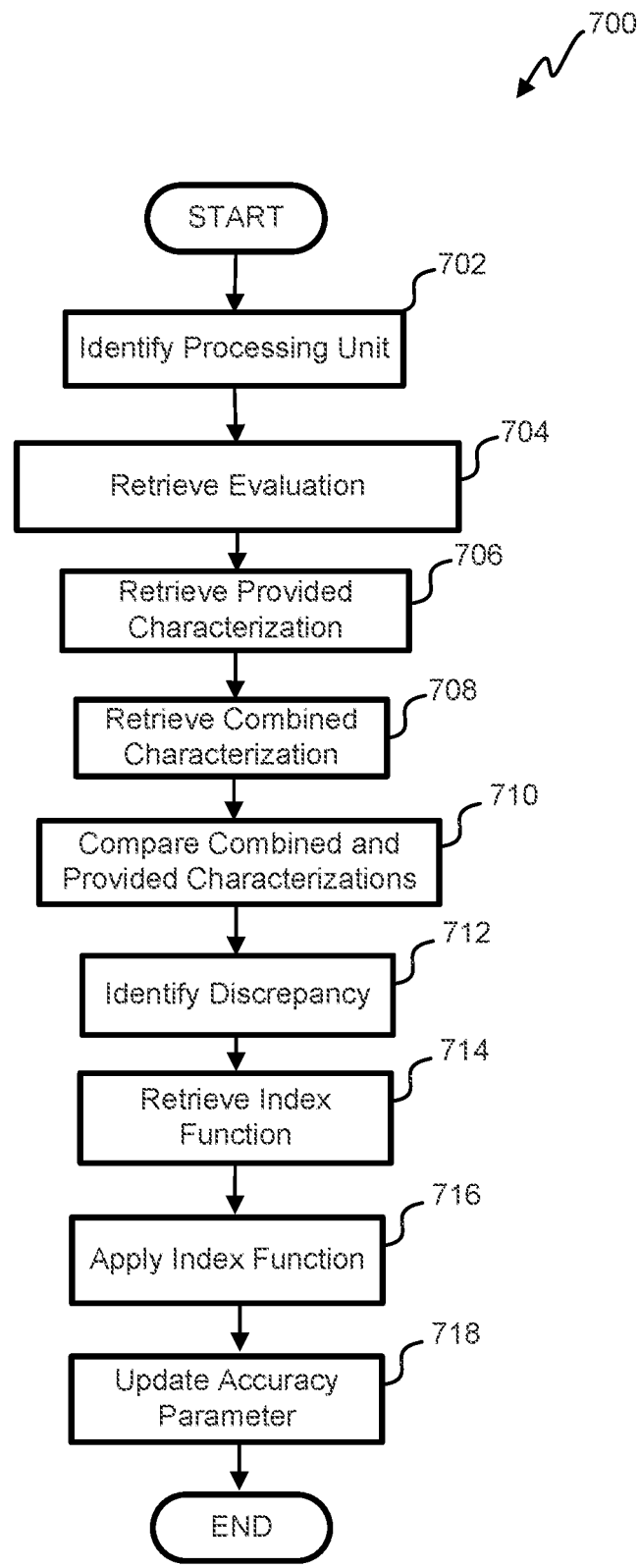
FIG. 10 is a flowchart illustrating one embodiment of a process for calculating an accuracy parameter with a distributed processing system.

With reference now to FIG. 10, a flowchart illustrating one embodiment of a process 700 for calculating an accuracy parameter is shown. In some embodiments, the process 700 can be performed by the distributed processing system 100 and/or a component thereof including, for example, the server 102.

The process 700 begins at block 702 wherein the independent processing unit 113 is identified. In some embodiments, the independent processing unit 113 can be identified as an independent processing unit 113 that completed an evaluation and/or was included in the set of independent processing units. After the independent processing unit 113 has been identified, the process 700 proceeds to block 704 wherein the evaluation is retrieved. In some embodiments, the evaluation can be retrieved by component of the distributed processing system 100 such as, for example, the server 102, and can be retrieved, for example, from the database server 104.

After the evaluation has been retrieved, the process 700 proceeds to block 706 wherein the characterization is retrieved. The characterization can be retrieved from the evaluation retrieved in block 704, and/or can be separated retrieved by, for example, the server 102 from the database 104. After the characterization has been retrieved, the process 700 proceeds to block 708 wherein the final characterization is retrieved. In some embodiments, the final characterization can be retrieved from the database 104 and/or one of the databases thereof.

After the final characterization has been retrieved, the process 700 proceeds to block 710 wherein the final characterization is compared with the characterization. In some embodiments, this comparison can be performed by the server 102. After the characterization and the final characterization have been compared, the process 700 proceeds to block 712 wherein a difference between the characterization and the final characterization is determined. In some embodiments, this can include determining the absolute value and/or magnitude of difference between the characterization and the final characterization, in some embodiments, this can include determining the degree to which the characterization score is higher or lower than the final characterization. In some embodiments, this determination can be made by the server 102.

After the discrepancy between the characterization and the final characterization has been determined, the process 700 proceeds to block 714 wherein an index function is retrieved. In some embodiments, the index function can be used to generate an update value based on the discrepancy and/or differences between the characterization and the final characterization. In some embodiments, for example, the index function can be used to calculate one or several statistical parameters with respect to one or both of the characterization and the final characterization such as, for example, a standard deviation. After the index function has been retrieved, the process 700 proceeds to block 716 wherein the index function is applied. In some embodiments, for example, the index function can be applied to the server 102. In some embodiments, the application of the index function can include the determination of the discrepancy between the characterization and the final characterization in terms of the statistical parameters such as, for example, a standard deviation.

After the index function is applied, the process 700 proceeds to block 718 wherein the accuracy parameter is updated. In some embodiments, for example, the update value, which is the result of the applied index function, can be used to augment and/or update the accuracy parameter that can be, for example, stored within the database 104.

Figure 11:
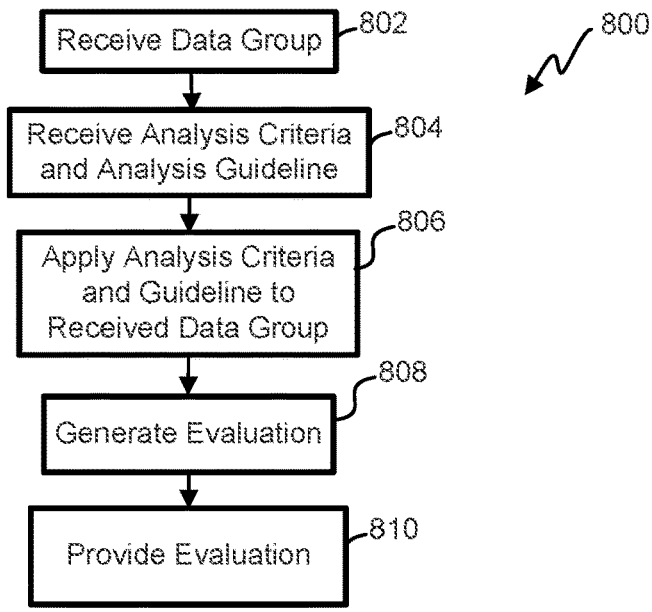
FIG. 11 is a flowchart illustrating one embodiment of a process for analyzing a piece of data and/or a group of data with a distributed processing system.

With reference now to FIG. 11, a flowchart illustrating one embodiment of a process 800 for analyzing a piece of data and/or a group of data is shown. In some embodiments, this process 800 can be performed at one or several of the independent processing units 113, and can be specifically performed by the analysis engine 254 and/or with the analysis engine 254 by a user.

The process 800 begins at block 802 wherein a piece of data and/or group of data is received. In some embodiments, this data can be received from the server via the network 120 and the network interface 250. After the data has been received, the process 800 proceeds to block 804, wherein the analysis criteria and analysis guideline are received. In some embodiments, the analysis criteria and the analysis guideline can be received from the server 102, from the content server 112, and/or from the database 104. In some embodiments, the analysis criteria and analysis guideline can be received simultaneously with the receipt of the piece of data and/or the group of data, and in some embodiments, the analysis criteria and analysis guideline can be received separately from the piece of data and/or the group of data. In one embodiment, the independent processing unit 113 can generate and send a signal requesting the analysis criteria and/or the analysis guideline, and can receive the analysis criteria and/or analysis guideline in response to this signal.

After the analysis criteria and analysis guideline have been received, the process 800 proceeds to block 806, wherein the analysis criteria and analysis guideline are applied to the received piece of data and/or data group. In some embodiments, this step can include identifying one or several analysis parameters of the analysis criteria, determining the degree to which the attributes associated with the analysis parameters occur, and/or the frequency with which attributes associated with the analysis parameters occur in the one or several pieces of data and/or groups of data. These attributes can relate to, for example, word usage, vocabulary, spelling, grammar, content, citations, use of citations, or the like. In one embodiment, for example, these criteria can include the number and/or frequency of misspellings, the number and/or frequency of grammar errors, the level of vocabulary of the one or several pieces of data and/or data groups, the correctness and/or level of word usage, the coherency, accuracy, and/or relevancy of the pieces of data and/or data groups, or the like. In some embodiments, this step can further include the application of the analysis guideline to the received piece of data and/or data group. In some embodiments, the application of the analysis criteria can result in the generation of one or several parameter values. In some embodiments, the analysis guideline can influence and/or control how the analysis criteria are applied. This can include, for example, the degree to which a parameter is evaluated and/or the level of scrutiny applied to a parameter.

After the analysis criteria and analysis guideline have been applied to the piece of data and/or data group, the process 800 proceeds to block 808, wherein the evaluation is generated. In some embodiments, the evaluation can include information relating to the one or several parameter values, and how the one or several parameter values were calculated and/or determined, and in some embodiments, the evaluation can include a characterization which can be the result of the combination of the one or several parameter values. In some embodiments, the one or several parameter values can be combined as outlined in the analysis criteria.

After the evaluation has been generated, the process 800 proceeds to block 810, wherein the evaluation is provided. In some embodiments, the evaluation can be provided to the server 102 and/or any other component of the distributed processing system 100. In some embodiments, the providing of the evaluation can include, for example, the generation of a signal comprising the evaluation, and the sending of the signal, via the network 120, to the server 102 or other component of the distributed processing system 100.

Figure 12:
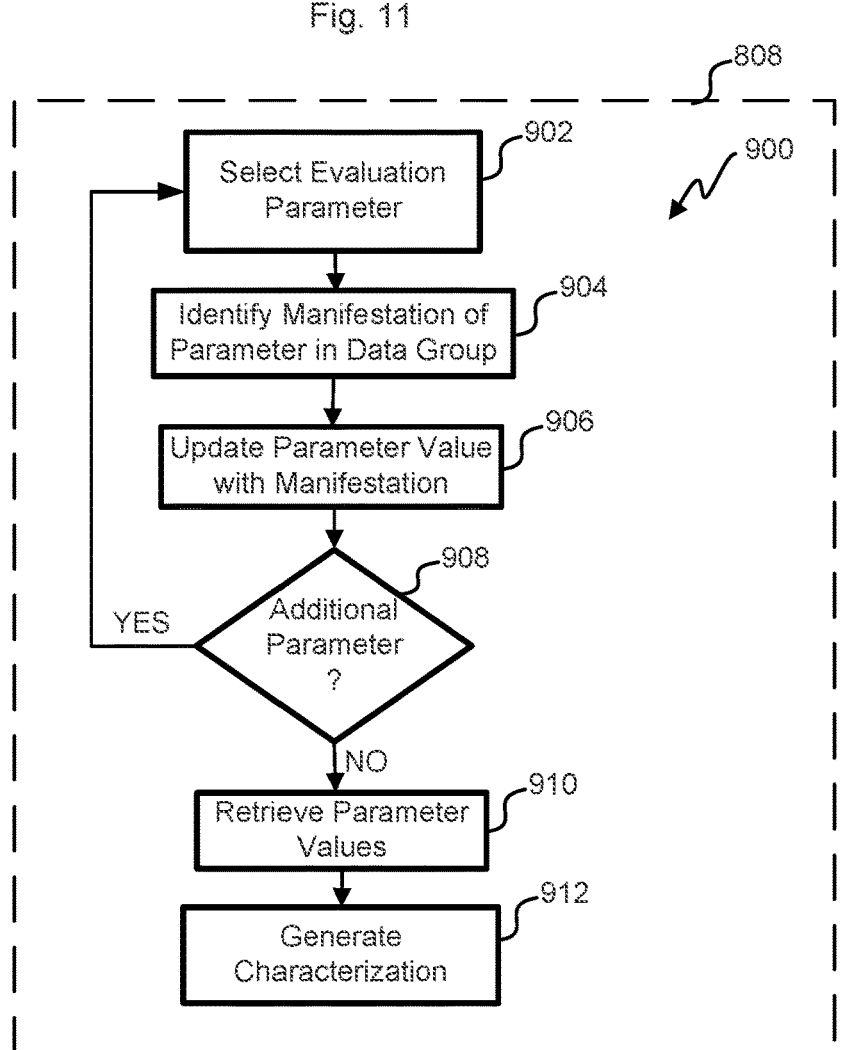
FIG. 12 is a flowchart illustrating one embodiment of a process for generating the evaluation with a distributed processing system.

With reference now to FIG. 12, a flowchart illustrating one embodiment of a process 900 for generating the evaluation is shown. In some embodiments, the process 900 can be performed in the place of, or as a part of one or both of blocks 806 and 808 of FIG. 11. The process 900 begins at block 902, wherein an analysis parameter is selected. In some embodiments, the analysis parameter can be selected from one of the analysis parameters of the evaluation criteria. In some embodiments, the selected analysis parameter can be a previous unselected analysis parameter.

After the analysis parameter has been selected, the process 900 proceeds to block 904, wherein one or several manifestations of the attribute associated with the parameter are identified in the piece of data and/or data group. In some embodiments, this can be achieved by the review of the piece of data and/or data group by the analysis engine and/or user of the analysis engine. The review can include, for example, a review of spelling, grammar, substance, word usage, vocabulary level, citations, or any other attribute.

After and/or simultaneous with the identification of the one or several manifestations of the attribute associated with the parameter in the piece of data and/or data group, the process 900 proceeds to block 906, wherein a parameter value associated with manifestations and/or the analysis parameter is updated. In some embodiments, this update to the value can reflect the frequency of occurrence and/or the degree of occurrence of the attribute associated with the analysis parameter in the piece of data and/or data group.

After the parameter value has been updated, the process 900 proceeds to decision state 908, wherein it is determined if there is an additional parameter. In some embodiments, this can include, for example, determining whether there are any remaining, unevaluated parameters of the analysis criteria. If it is determined that there are additional, unevaluated parameters, then the process 900 returns to block 902 and proceeds as outlined above. If it is determined that there are not additional, unevaluated parameters, then the process 900 proceeds to block 910, wherein the parameter values are retrieved. In some embodiments, this can include retrieving all of the parameter values for parameters of the analysis criteria.

After the parameter values have been received, the process 900 proceeds to block 912, wherein the characterization is generated. In some embodiments, the characterization can be generated by the combination of the parameter values. These parameter values can be combined by the independent processing unit 113, and/or by the analysis engine 254 or user thereof. In some embodiments, these parameter values can be combined according to the analysis guideline.

Figure 13:
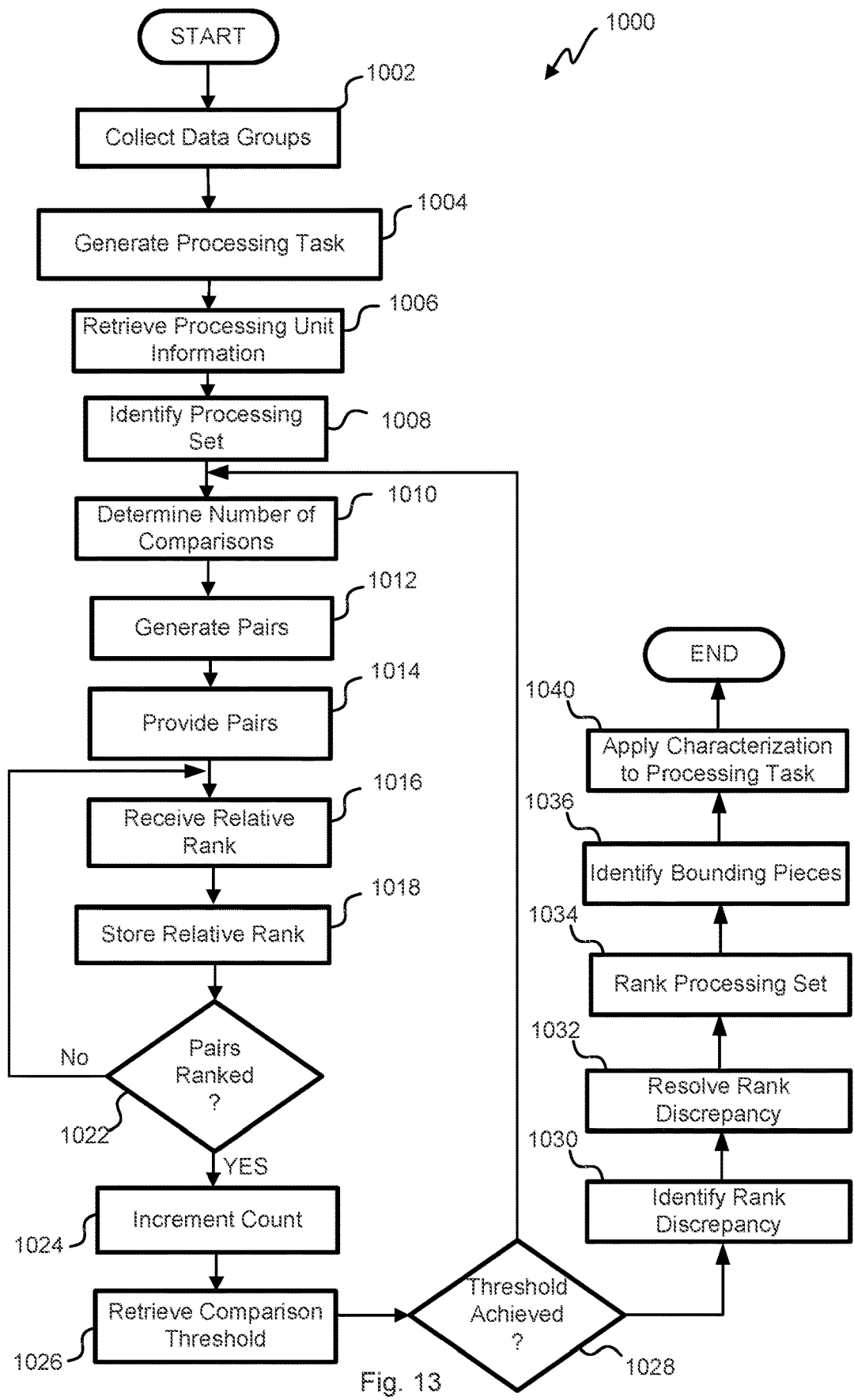
FIG. 13 a flowchart illustrating one embodiment of a process for parallelized evaluation with a distributed processing system.

With reference now to FIG. 13, a flowchart illustrating one embodiment of a process 1000 for parallelized evaluation is shown, which parallelize evaluation can decrease the amount of time required to process an amount of pieces of data and/or data groups. In some embodiments, the process 1000 can be used to determine the relative ranking of one or several pieces of data and/or data groups within a processing task and/or to thereby assign and/or determine a characterization for the one or several pieces of data and/or data groups. In some embodiments, the process 1000 can provide for the parallel evaluation of a plurality pieces of data and/or data groups and a relative ranking of those simultaneously evaluated pieces of data and/or data groups. The process 1000 can be performed by the distributed processing system 100 and/or component thereof including, for example, one or several independent processing units 113, and/or the server 102.

The process 1000 begins at block 1002 wherein two or more pieces of data and/or data groups are collected. In some embodiments, the pieces of data and/or data groups can be collected by the content server 112 from, for example, one or several originating devices. Alternatively, in some embodiments, this collection can be performed by the server 102.

After the work product is collected, the process 1000 proceeds to block 1004 wherein the processing task is generated and/or aggregated. In some embodiments, the processing task can be aggregated at the content server 112, and in some embodiments, the processing task can be aggregated at the server 102. In some embodiments, the aggregation of the processing task can include the combination of one or several pieces of data and/or groups of data.

After the processing task has been generated, the process 1000 proceeds to block 1006 wherein independent processing unit information is retrieved and/or received. In some embodiments, this information can identify one or several attributes of one or several independent processing units including, for example, one or several attributes of the analysis engine 254 and/or the user of the analysis engine. These attributes can, for example, identify the number of evaluations provided by one or several of the independent processing units 113 including, for example, evaluations performed by the analysis engine 254, and/or evaluation performed by a user of the analysis engine 254.

After the independent processing unit information is retrieved, the process 1000 proceeds to block 1008 wherein the processing set is identified. In some embodiments, the processing set can comprise a plurality of independent processing units and/or users of the independent processing units. This set can be selected, in some embodiments, based on the independent processing unit information that is retrieved in block 1006, the analysis criteria, and/or analysis guideline. In some embodiments, this set can be selected by the server 102 and/or by another component of the distributed processing system 100.

After the processing set has been identified, the process 1000 proceeds to block 1010, wherein a desired number of comparisons is determined. In some embodiments the desired number of comparisons can be defined in, for example, the analysis guideline. In some embodiments, this number can vary based on the degree of certainty desired for the characterizations and/or the amount of time, cost, and/or processing resources to be consumed by the processing task.

After the desired number of comparisons is determined, the process 1000 proceeds to block 1012, wherein one or several pairs of pieces of data and/or data groups and/or groups of pieces of data and/or data groups are created. In some embodiments, these groups can be created so that a relative ranking and/or comparison can be performed. Thus, in one embodiment, these groups can include at least two pieces of data and/or data groups so that the one can be compared to the other and/or relatively ranked with respect to the other. In some embodiments, these pairs can be selected at random, and in some embodiments, these pairs can be selected based on some attribute of the pieces of data and/or data groups such as, for example, the originator of the pieces of data and/or data groups, any previous characterizations of pieces of data and/or data groups from the originator, or the like.

After the one or several pairs of pieces of data and/or data groups and/or groups of pieces of data and/or data groups have been generated, the process 1000 proceeds to block 1014, wherein the pairs are provided to, for example, one or several independent processing units 113. In some embodiments, this providing can include the generation and sending of an electric signal containing the one or several pairs of pieces of data and/or data groups and/or groups of pieces of data and/or data groups. This signal can be generated and/or sent by the server 102.

After the pairs have been provided, the process 1000 proceeds to block 1016, wherein the relative rank of one or several pairs of pieces of data and/or data groups and/or groups of pieces of data and/or data groups are received. In some embodiments, these one or several pairs of pieces of data and/or data groups and/or groups of pieces of data and/or data groups can be received by the server 102 from one or several of the independent processing units 113. These relative rankings can identify which of the pieces of data and/or data groups of the one or several pairs and/or groups is (are) relatively better and/or relatively worse. After the relative rank has been received, the process 1000 proceeds to block 1018, wherein the received relative rank information is stored. In some embodiments, this information can be stored in, for example, a component of the distributed processing system 100 such as, for example, the database 104.

After the relative rank of the provided work product pieces has been received, the process 1000 proceeds to decision state 1022 wherein it is determined if all of the pairs and/or groups in the processing task have been ranked. In some embodiments, this determination can be made by comparison of the number of pairs that were sent by independent processing units 113 and the number of evaluations provided by independent processing units 113. If it is determined that not all pairs/groups have been ranked, then the process can wait a predetermined period and return to block 1016. Alternatively, in some embodiments, if it is determined that an evaluation of one or several pairs/groups is missing, the server 102 can identify the independent processing unit 113 that received the pairs/groups and send a command/reminder to complete the evaluation and/or send the evaluation.

If it is determined that evaluations have been received for all of the pairs/groups, then the process 1000 proceeds to block 1024 wherein the count is incremented. In some embodiments, the number of completed and/or requested evaluations can be tracked by incrementing a value when data is sent for evaluation and/or when an evaluation is received. In some embodiments, this value can be specific to a processing task, and in some embodiments, this value can include a portion that is specific to a processing task, and a portion specific to some or all of the pieces of data and/or data groups of the processing task. Thus, in one embodiment, the number of times a piece of data and/or a group of data is evaluated can be tracked, as well as the total number of evaluations performed for a processing task. In some embodiments, the determination of the number of completed evaluations can include retrieving the value tracking the number of evaluations.

After the count has been incremented, the process 1000 proceeds to block 1026 wherein the threshold is retrieved. In some embodiments, this threshold can identify the minimum number of evaluations to be performed to complete the processing task. This threshold can, in some embodiments, be specified in the analysis guideline and can be received from, for example, the database 104.

After the threshold has been retrieved, the process 1000 proceeds to decision state 1028 wherein it is determined if the threshold has been achieved. In some embodiments, this can include the comparison of the value tracking the number of evaluations to the threshold. This comparison can be performed by the server 102. In some embodiments, a Boolean-value can be assigned to the processing task indicating whether the threshold has been achieved. Similarly, in any embodiment described herein, Boolean values can be assigned to indicate the outcome of a decision state, with a first Boolean value indicating a true condition corresponding to a "yes" answer in response to the question of the decision state and a second Boolean value indicating a false condition corresponding to a "no" answer in response to the question of the decision state. In some embodiments, the server can then use these Boolean values to identify the outcome of the decision state, and to store the outcome of the decision state in, for example, the database 104.

If it is determined that the threshold is not achieved, then the process 1000 returns to block 1010 and proceeds as outlined above. If it is determined that the threshold has been achieved, then the process 1000 proceeds to block 1030 wherein the relative rankings of the pieces of data and/or data groups in the pairs/groups are compared to identify ranking discrepancies. In some embodiments, for example, the ranking discrepancies can be differences in the relative rankings provided by the independent processing units 113. In some embodiments, this can include the retrieval of the evaluations and/or rankings from the independent processing units 113 and/or the database 104 and the comparison of these evaluations by the server 102.

After the ranking discrepancies have been identified, the process 1000 proceeds to block 1032 wherein any identified ranking discrepancies are resolved. In some embodiments, for example, this can include determining a final relative ranking of the pieces of data and/or data groups based on the provided rankings. In some embodiments, this can include the averaging of the ranking, and/or the application of a weighting function to the rankings. This resolution of the rankings of the pieces of data and/or data groups can be performed by the server 102 and/or any other component of the distributed processing system 100.

After the ranking discrepancies have been resolved, the process 1000 proceeds to block 1034 wherein the processing task is ranked. In some embodiments, this can include applying the final rankings, including, for example, any resolved rankings to the processing task, and particularly to the pieces of data and/or data groups forming the processing task. In some embodiments, this can be performed by the server 102 and/or any other component of the distributed processing system 100.

After the processing task is ranked, the process 1000 proceeds to block 1036 wherein one or several bounding data pieces are identified. In some embodiments, bounding data pieces can be pieces of data and/or groups of data located between characterization levels such that all the pieces of data and/or data groups that are relatively higher ranked than the bounding piece have a characterization from a first subset of scores that is higher than the characterization of the bounding piece, and all the pieces of data and/or data groups that are ranked lower than the bounding piece have a characterization from a second subset of scores that is lower than the characterization of the bounding piece.

In some embodiments, the identification of the bounding pieces can include selecting one or several pieces of data and/or data groups of the processing task as potential bounding pieces, characterizing the one or several pieces of data and/or data groups of the processing, and selecting one or several of the potential bounding pieces as bounding pieces. In some embodiments, the one or several potential bounding pieces can be selected based on one or several parameters and/or attributes of the pieces of data and/or data groups of the processing task. In one embodiment, for example, the bounding pieces can be selected based on, for example, the past characterizations of one or several pieces of data and/or data groups from one or several of the originating device. In some embodiments, the one or several bounding pieces can be selected by performing a brief analysis of the pieces of data and/or data groups in the processing task.

After the potential bounding pieces have been selected, and as mentioned above, a characterization can be given to some or all of the potential bounding pieces. This characterization can proceed according to the process 900 depicted in FIG. 12. After the characterizations of the potential bounding pieces have been received, and as mentioned above, one or several bounding pieces can be selected. In some embodiments, the one or several selected bounding pieces can, as described above, have a characterization that is between levels.

Alternatively to the above steps for identifying one or several bounding pieces, in some embodiments, the bounding pieces can be one or several pre-generated pieces of data and/or data groups that can be, for example, created so as to have a desired characterization. In such an embodiment, the step of block 1036 can comprise retrieving these bounding pieces from, for example, the database 104.

After the bounding pieces have been identified, the process 1000 proceeds to block 1040 wherein the processing task is characterized and/or in which a characterization is applied to the processing task. In some embodiments, the characterization of the processing task can be achieved by identifying the relative rank of the one or several bounding pieces within the processing task. In some embodiments, in which the bounding pieces are pre-generated pieces of data and/or data groups, this can include performing the steps of blocks 1010 through 1018 to determine a relative rank of the bounding pieces. In some embodiments, this application of the characterization can be performed by the server 102 and/or any other component of the distributed processing system 100.

After the bounding pieces are relatively ranked, or in some embodiments in which the bounding pieces are identified from the pieces of data and/or groups of data of the processing task, the application of the characterization to the processing task can include identifying pieces of data relatively positioned between two adjacent bounding pieces, and assigning characterization based on these bounding pieces. Thus, when the bounding pieces are selected such that they are between characterization levels, pieces of data and/or data groups that are relatively bounded by two bounding pieces can be assigned the characterization level that is likewise bounded by the two bounding pieces.

In other embodiments, the characterization level can be determined based on the separation of characterization levels between the bounding scores, and a determination of the degree of separation between the adjacent bounding scores and an intermediate piece of data and/or data group. This degree of separation can be expressed as a fraction having a denominator of the total number of pieces of data and/or data groups between the bounding pieces, and a numerator of the number of pieces of data and/or data groups separating the intermediate piece of data from one of the bounding pieces. In such an embodiment, the characterization level can be calculated as the characterization level of the bounding piece having a relatively lower characterization level plus the value created by the multiplication of the fractional representation of the degree of separation and the difference in the characterization levels of the bounding pieces.

Figure 14:
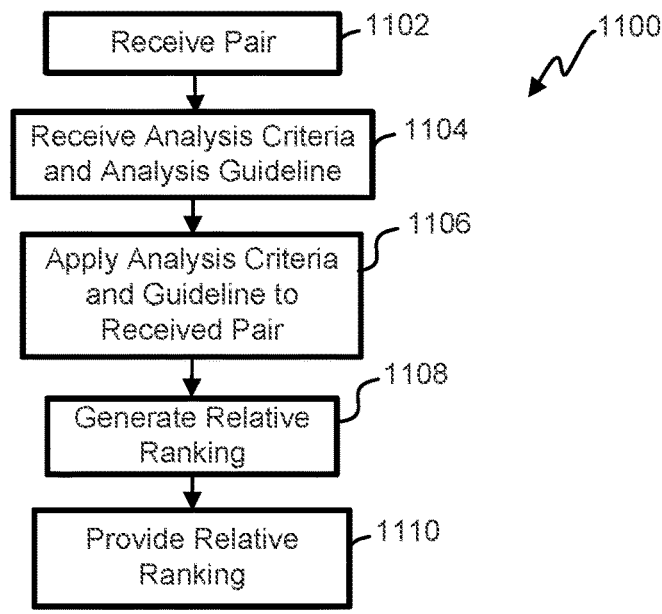
FIG. 14 a flowchart illustrating one embodiment of a process for analyzing a piece of data and/or a group of data with a distributed processing system.

With reference now to FIG. 14, a flowchart illustrating one embodiment of a process 1100 for analyzing a piece of data and/or a group of data is shown. In some embodiments, this process 1100 can be performed at one or several of the independent processing units 113, and can be specifically performed by the analysis engine 254 and/or with the analysis engine 254 by a user.

The process 1100 begins at block 1102 wherein a pair/group is received. In some embodiments, the pair/group can comprise two or more pieces of data and/or data groups. In some embodiments, this pair/group can be received from the server 102 via the network 120 and the network interface 250. After the pair/group has been received, the process 1100 proceeds to block 1104, wherein the analysis criteria and analysis guideline are received. In some embodiments, the analysis criteria and the analysis guideline can be received from the server 102, from the content server 112, and/or from the database 104. In some embodiments, the analysis criteria and analysis guideline can be received simultaneously with the receipt of the pair/group, and in some embodiments, the analysis criteria and analysis guideline can be received separately from the pair/group. In one embodiment, the independent processing unit 113 can generate and send a signal requesting the analysis criteria and/or the analysis guideline, and can receive the analysis criteria and/or analysis guideline in response to this signal.

After the analysis criteria and analysis guideline have been received, the process 1100 proceeds to block 1106, wherein the analysis criteria and analysis guideline are applied to the received pair/group. In some embodiments, this step can include identifying one or several analysis parameters of the analysis criteria, determining the relative rank of the pair/group with respect to these one or several analysis parameters, which can be based on, for example, the relative degree to which the attributes associated with the analysis parameters occur, and/or the relative frequency with which attributes associated with the analysis parameters occurs in the one or several pieces of data and/or groups of data in the pair/group. These attributes can relate to, for example, word usage, vocabulary, spelling, grammar, content, citations, use of citations, or the like. In one embodiment, for example, these criteria can include the number and/or frequency of misspellings, the number and/or frequency of grammar errors, the level of vocabulary of the one or several pieces of data and/or data groups, the correctness and/or level of word usage, the coherency, accuracy, and/or relevancy of the pieces of data and/or data groups, or the like. In some embodiments, this step can further include the application of the analysis guideline to the received pair/group. In some embodiments, the application of the analysis criteria can result in the relative ranking of the pieces of data and/or data groups of the pair with respect to one or several analysis parameters.

After the analysis criteria and analysis guideline have been applied to pair/group, the process 1100 proceeds to block 1108, wherein the relative ranking is generated. In some embodiments, the relative rankings with respect to the one or several analysis parameters can be combined to create an overall relative ranking. In some embodiments, the one or several relative rankings with respect to the analysis parameters can be combined as outlined in the analysis criteria.

After the evaluation has been generated, the process 1100 proceeds to block 1110, wherein the relative ranking is provided. In some embodiments, the relative ranking can be provided to the server 102 and/or any other component of the distributed processing system 100. In some embodiments, the providing of the relative ranking can include, for example, the generation of a signal comprising the relative ranking, and the sending of the signal, via the network 120, to the server 102 or other component of the distributed processing system 100.

Figure 15:
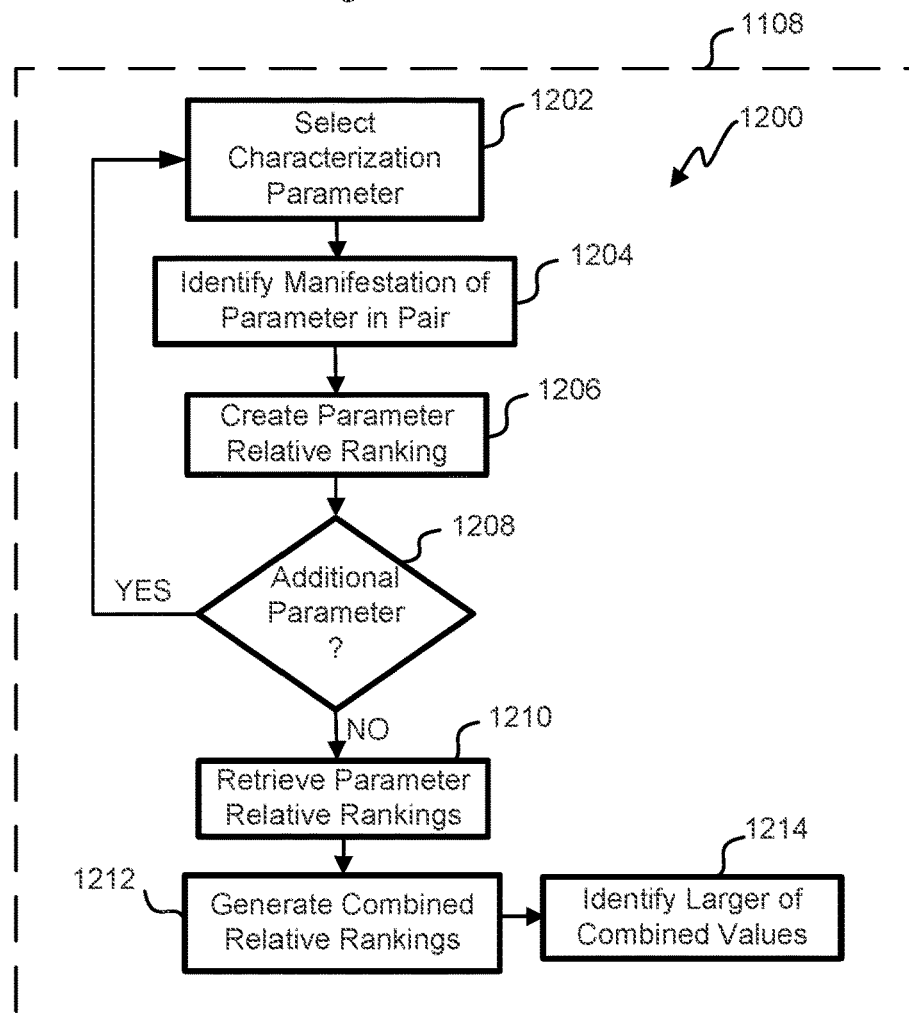
FIG. 15 a flowchart illustrating one embodiment of a process for generating the relative ranking with a distributed processing system.

With reference now to FIG. 15, a flowchart illustrating one embodiment of a process 1200 for generating the relative ranking is shown. In some embodiments, the process 1200 can be performed in the place of, or as a part of one or both of blocks 1106 and 1108 of FIG. 14. The process 1200 begins at block 1202, wherein an analysis parameter is selected. In some embodiments, the analysis parameter can be selected from one of the analysis parameters of the evaluation criteria. In some embodiments, the selected analysis parameter can be a previous, unselected analysis parameter.

After the analysis parameter has been selected, the process 1200 proceeds to block 1204, wherein one or several manifestations of the attribute associated with the parameter are identified in the pieces of data and/or data groups of the pair/group. In some embodiments, this can be achieved by the review of the pieces of data and/or data groups of the pair/group by the analysis engine 254 and/or user of the analysis engine 254. The review can include, for example, a review of spelling, grammar, substance, word usage, vocabulary level, citations, or any other attribute.

After and/or simultaneously with the identification of the one or several manifestations of the attribute associated with the parameter in the pieces of data and/or data groups of the pair/group, the process 1200 proceeds to block 1206, wherein a parameter relative ranking is created, and particularly wherein a parameter relative ranking value identifying the relative degree to which the attributes associated with the analysis parameters occur, and/or the relative frequency with which attributes associated with the analysis parameters occurs in the one or several pieces of data and/or groups of data of the pair/group is created. In some embodiments, this can include comparing the relative degree to which the attributes associated with the analysis parameters occur, and/or the relative frequency with which attributes associated with the analysis parameters occurs in the one or several pieces of data and/or groups of data of the pair/group, and identifying which of the pieces of data and/or data groups is relatively better with regard to that analysis parameter. In some embodiments, a first value can be associated with a piece of data and/or data group if it is relatively better with respect to an analysis parameter, a second value can be associated with a piece of data and/or data group if it is relatively worse with respect to an analysis parameter, and a third value can be associated with a piece of data and/or data group if it is relatively equal with respect to an analysis parameter.

After the parameter relative ranking has been created, the process 1200 proceeds to decision state 1208, wherein it is determined if there is an additional parameter. In some embodiments, this can include, for example, determining whether there are any remaining, unevaluated parameters of the analysis criteria. If it is determined that there are additional, unevaluated parameters, then the process 1200 returns to block 1202 and proceeds as outlined above. If it is determined that there are not additional, unevaluated analysis parameters, then the process 1200 proceeds to block 1210, wherein the parameter relative ranking values are retrieved. In some embodiments, this can include retrieving all of the parameter relative ranking values for parameters of the analysis criteria.

After the parameter relative ranking values have been received, the process 1200 proceeds to block 1212, wherein the relative ranking of the pair/group is generated. In some embodiments, the relative ranking can be generated by the combination of the parameter relative rankings. In some embodiments, these parameter relative ranking values can be combined according to the analysis guideline. In some embodiments, for example, some or all of the analysis parameters can be associated with a weighting value. In such an embodiment, the combined relative ranking can be calculated by a combination of the weighting values and the parameter relative ranking values. In one embodiment, for example, some or all of the parameter ranking values can be multiplied by their weighting value, and the products of those multiplications can be added to create a combined value. In one such embodiment, the combined values of the pieces of data and/or data groups of the pair/group can be compared to determine the relative ranking of the pair/group, as indicated in block 1214 of FIG. 15. Thus, in one embodiment, a piece of data and/or data group can be relatively better if its combined value is larger than the combined value of another piece of data and/or data group. These parameter relative rankings can be generated by the independent processing unit 113, and/or by the analysis engine 254 or user thereof.

Figure 16:
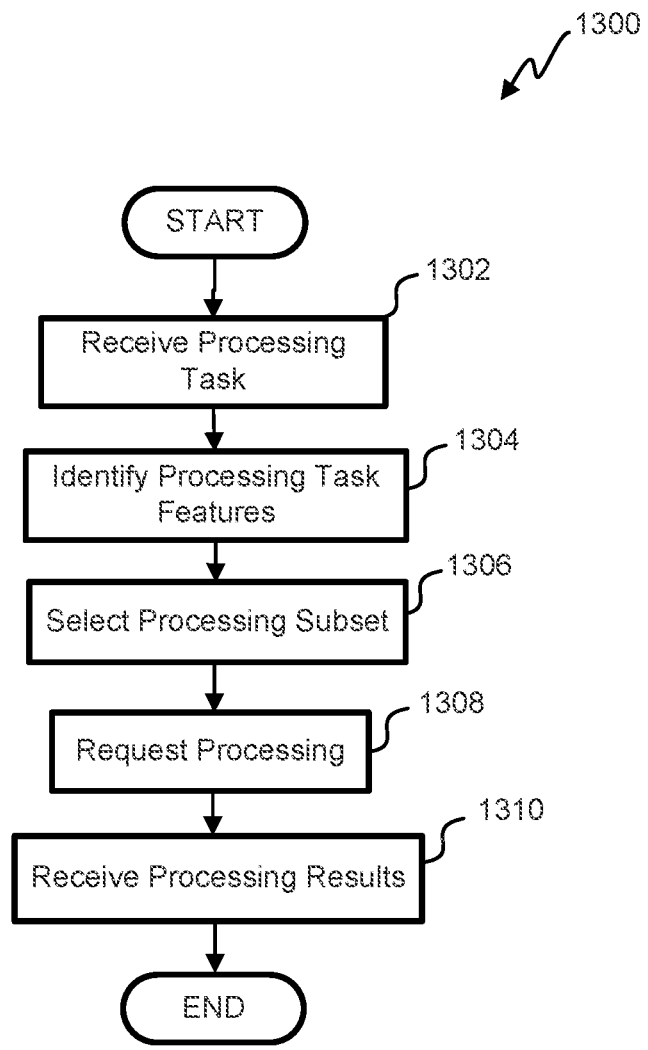
FIG. 16 is a flowchart illustrating one embodiment of a process for selecting a subset.

With reference to now FIG. 16, a flowchart illustrating one embodiment of a process 1300 for selecting a subset is shown. The process 1300 can be performed by one or several components of the distributed processing system 100, and in some embodiments, the process 1300 can be performed by the server 102.

In some embodiments, the subset of the processing task can be selected to improve the overall efficiency of use of computing resources and to decrease the total amount of time and resources used to evaluate and/or analyze the processing task. In some embodiments, for example, the different levels of evaluation, and particularly, different levels of accuracy of evaluation can be achieved by use of different evaluation resources. Particularly, in some embodiments, the independent processing units 113 provide more accurate and/or more complete evaluations than provided by the server 102. However, the independent processing units 113, in such embodiments, require more processing resources for the evaluation, more human involvement in the evaluation, and/or take more time for generating the evaluations. Thus, use of the independent processing units 113 can increase costs, in resources, time, and money associated with evaluations.

However, many of the benefits of evaluation of an entire processing task by the independent processing units 113 can be achieved by selecting a subset of the processing task for evaluation by the independent processing units 113, and using the resulting evaluations of the subset to improve the accuracy and quality of evaluations generated by the server 102, which can include, for example, using the resulting evaluations of the subset to train an evaluation model that is used by the server 102, as quality control for an evaluation model that is used by the server 102, and/or as quality control for evaluation generated by the server 102.

The process 1300 begins a block 1302, wherein the processing task is received, which processing task can include one or several pieces of data and/or data groups. In some embodiments, the one or several pieces of data and/or data groups can be received by the server 102 from the content server 112 and/or from the database 104. In some embodiments, the one or several pieces of data and/or data groups can be received already organized into a single processing task, and in some embodiments, the one or several pieces of data and/or data groups can be received by the server 102 and then organized into the processing task.

After the processing task has been received, the process 1300 proceeds to block 1304, wherein processing task features are identified. In some embodiments, the processing task features can be the aggregate of features of the individual one or more pieces of data and/or data groups. The features of the individual one or more pieces of data and/or groups of data can be determined by evaluation of some or all of the individual one or more pieces of data and/or groups of data. Each of the features of the individual one or more pieces of data and/or groups of data can identify some aspect of the individual one or more pieces of data and/or groups of data including, for example, the size of the one or more pieces of data and/or groups of data, including, for example, the word count, the quality of the one or more pieces of data and/or groups of data including, for example, one or several measures of coherence, results of latent semantic analysis, aspects of content, punctuation, ratio of unique words to total word count, grammatical errors, spelling errors, or the like.

After the processing task features have been identified, the process 1300 proceeds to block 1306, wherein a processing subset is identified. In some embodiments, the processing subset can be some desired number of pieces of data and/or data groups of the processing task. This number can vary based on a number of parameters including, for example, available resources, acceptable costs in one or more of time, resources, and money, a desired accuracy level, or the like. The processing subset can be a number of pieces of data and/or groups of data that is a desired percentage of the total number of pieces of data and/or groups of data in the processing task. This percentage can be, for example, approximately 1%, approximately 5%, approximately 10%, approximately 15%, approximately 20%, approximately 25%, and/or any other or intermediate percent. As used herein, "approximately" denotes a range that is +/−1% of the therewith associated value, +/−2% of the therewith associated value, +/−5% of the therewith associated value, or +/−10% of the therewith associated value.

After the processing subset has been selected, the process 1300 proceeds to block 1308, wherein processing is requested. In some embodiments, this can include requesting processing of the subset by, for example, one or several of the independent processing units 104, and/or requesting processing of the one or several pieces of data and/or data groups in the processing task and either included or not included in the subset by, for example, the server 102.

After processing has been requested, the process 1300 proceeds to block 1310, wherein the processing results are received. In some embodiments, the processing results can be received by the server 102 and can be stored in, for example, the database 104.

Figure 17:
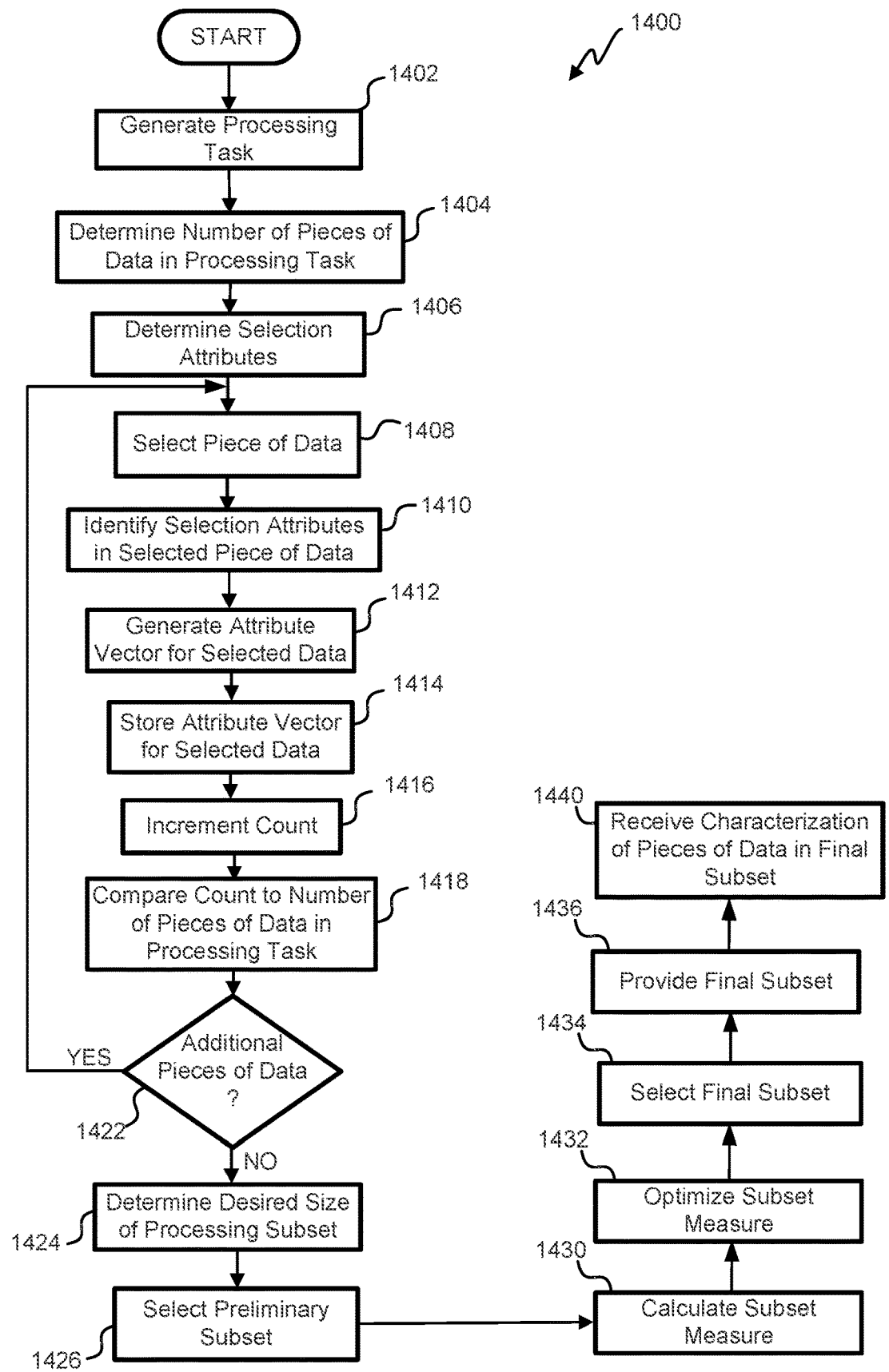
FIG. 17 is a flowchart illustrating one embodiment of a process for selecting a final sub set.

With reference now to FIG. 17, a flowchart illustrating one embodiment of a process 1400 for selecting a final subset is shown. The process 1400 can be performed by one or several components of the distributed processing system 100, and in some embodiments, the process 1400 can be performed by the server 102.

The process 1400 begins at block 1402, wherein the processing task is generated and/or aggregated. In some embodiments, the processing task can be aggregated at the content server 112, and in some embodiments, the processing task can be aggregated at the server 102. In some embodiments, the aggregation of the processing task can include the combination of one or several pieces of data and/or groups of data.

After the processing task has been generated, the process 1400 proceeds to block 1404, wherein the number of pieces of data in the processing task is determined. In some embodiments, for example, a count of total number of pieces of data and/or groups of data in the processing task can be generated during the aggregation of the processing task. In such an embodiment, this count can be retrieved and used to determine the number of pieces of data in the processing task. In other embodiments, after the processing task has been aggregated, the number of pieces of data in the processing task can be counted by, for example, the server 102.

After the number of pieces of data in the processing task have been determined, the process 1400 proceeds to block 1406, wherein one or several selection attributes are determined. In some embodiments, the selection attributes correspond to the features of the one or several pieces of data and/or groups of data discussed in reference block 1304 of FIG. 16. These selection attributes identify some aspect of the individual one or more pieces of data and/or groups of data including, for example, the size of the one or more pieces of data and/or groups of data, including, for example, the word count, the quality of the one or more pieces of data and/or groups of data including, for example, one or several measures of coherence, results of latent semantic analysis, aspects of content, punctuation, ratio of unique words to total word count, grammatical errors, spelling errors, or the like. The selection attributes can be identified by a user distributed processing system 100 and can, in some embodiments, be provided by the user to the distributed processing system 100. In some embodiments, these provided selection attributes can be stored in, for example, the database 104 and can be determined by retrieving them from the database 104.

After the selection attributes have been determined, the process 1400 proceeds to block 1408, wherein one of the pieces of data and/or data groups of the processing task is selected. After the piece of data and/or data group has been selected, the process 1400 proceeds to block 1410, wherein the selection attributes of the selected piece of data are identified. In some embodiments, this can include analyzing the selected piece of data to identify data corresponding to the selection attributes. This can include, for example, determining the size of the selected piece of data, including, for example, counting the words in the selected piece of data, determining the quality of the selected piece of data which can include, for example, determining one or several measures of coherence, performing latent semantic analysis on the selected piece of data, evaluating the content of the selected piece of data, determining the ratio of unique words to total words, identifying the number, type, and/or degree of spelling, grammatical, and/or punctuation errors, or the like. In some embodiments, this can include the association of a value indicative of the identification of one or several of the selection attributes in the selected piece of data with the selected piece of data.

After the selection attributes have been identified in the selected piece of data, the process 1400 proceeds to block 1412, wherein an attribute vector is generated for the selected piece of data. In some embodiments, the attribute vector can be based on the values indicative of the identification of one or several of the selection attributes in the selected piece of data. In some embodiments, the vector can comprise a multi-dimensional vector, and the dimensions of the vector can correspond with selection attributes such that each dimension of the vector is associated with a unique one of the selection attributes. In some such embodiments, the vector can have the same number of dimensions as the number of selection attributes such that the vector can represent the combination of all of the selection attributes.

After the attribute vector has been generated, the process 1400 proceeds to block 1414, wherein the attribute vector for the selected piece of data is stored. In some embodiments, the attribute vector can be stored in, for example, the database 104. In some embodiments, in addition to storing the attribute vector, the process 1400 can further include associating a value indicative of the completed generation of the attribute vector for the selected piece of data and/or data group, and storing this value in, for example, the database 104.

After the attribute vector has been stored, the process 1400 proceeds to block 1416, wherein a count is incremented. In some embodiments, the count can track the number of pieces of data and/or data groups that have been evaluated to identify their selection attributes. After the count has been incremented, the process 1400 proceeds to block 1418, wherein the count is compared to the number of pieces of data and/or data groups in the processing task. In some embodiments, this comparison can be performed according to a Boolean function, wherein a first value, corresponding to a "true" condition, is associated with the processing task if the count matches the number of pieces of data in the processing task and a second value, corresponding to a "false" condition, is associated with the processing task if the count does not match the number of pieces of data in the processing tasks.

After the count has been compared with the number of pieces of data in the processing task, the process 1400 proceeds to decision state 1422, wherein it is determined if there are any additional, un-analyzed pieces of data. In some embodiments, this determination can be made by retrieving the Boolean-value associated with the processing task, and indicative of the result of the comparison of the count to the number of pieces of data in the processing task. If the second value is associated with the processing task, then there are additional pieces of data and/or groups of data that have not been analyzed for selection attributes, and the process returns to block 1408, wherein a piece of data and/or data group is selected. In some embodiments, the selected piece of data and/or data group does not have an associated value indicative of completion of analysis for selection attributes and/or for the completed generation of the attribute vector.

Returning again to decision state 1422, if the first value is associated with the processing task, then there are no additional pieces of data and/or groups of data that have not been analyzed for selection attributes, and the process 1400 proceeds to block 1424, wherein the desired size of the processing subset is determined. In some embodiments, the desired size of the processing subset can be directly or indirectly determined based on one or several user inputs, which inputs may be in the form of a desired confidence level and/or accuracy level, a desired cost level, a desired time frame for completion of the evaluation of the processing task, or the like.

After the desired size of the processing subset has been determined, the process 1400 proceeds to block 1426, wherein a preliminary subset is selected. The preliminary subset can include a subset of the pieces of data and/or data groups of the processing tasks, the number of pieces of data and/or data groups in which subset corresponds to the desired size of the processing subset. In some embodiments, the preliminary subset can be selected at random from the pieces of data and/or groups of data of the processing task, and in some embodiments, the preliminary subset can be selected according to one or several attributes of the pieces of data and/or data groups of the processing task, which attributes can be contained in the attribute vectors of the pieces of data and/or data groups.

After the preliminary subset has been selected, the process 1400 proceeds to block 1430, wherein a subset measure is calculated. In some embodiments, the subset measure can identify the degree to which the pieces of data and/or groups of data are representative of the entire processing task and/or the degree to which the subset will create a comprehensive model of evaluations for the processing tasks. In some embodiments, this measure can be calculated using one or several dimensions of the attribute vectors of the pieces of data and/or data groups in the subset, and/or in some embodiments, this measure can be calculated using one or several dimensions of the attribute vectors of the pieces of data and/or data groups not included in the subset.

After the subset measure has been calculated, the process 1400 proceeds to block 1432, wherein the subset measure is optimized. In some embodiments, the optimization of the subset measure can include maximizing or minimizing the subset measure. In some embodiments, the subset measure can be optimized by exchanging one or several of the pieces of data and/or data groups in the subset with one or several of the pieces of data and/or data groups not in the subset.

After the subset measure has been optimized, the process 1400 proceeds to block 1434, wherein the final subset is selected. In some embodiments, the final subset can include the pieces of data and/or data groups that resulted in the optimized subset measure. In some embodiments, a value indicative of inclusion in the final subset can be associated with each of the pieces of data and/or groups of data included in the final subset and/or a value indicative of exclusion from the final subset can be associated with each of the pieces of data and/or groups of data excluded from the final subset.

After the final subset has been identified, the process 1400 proceeds to block 1436, wherein the final subset is provided for evaluation by, for example, the independent processing units. In some embodiments, this processing can be performed as outlined in, for example, one or several of FIGS. 5-12 of this application. After the final subset has been provided, the process 1400 proceeds to block 1440, wherein a characterization of the pieces of data in the final subset is received. In some embodiments, this characterization can be received from one or several of the independent processing units 113. In some embodiments, and either simultaneous with, or subsequent to one or both of blocks 1436 and 1440 of FIG. 17, the process 1400 can provide the pieces of data and/or data groups that are not included in the subset for evaluation, which evaluation can be performed by the server 102, and the results of this evaluation can be received and/or stored.

Figure 18:
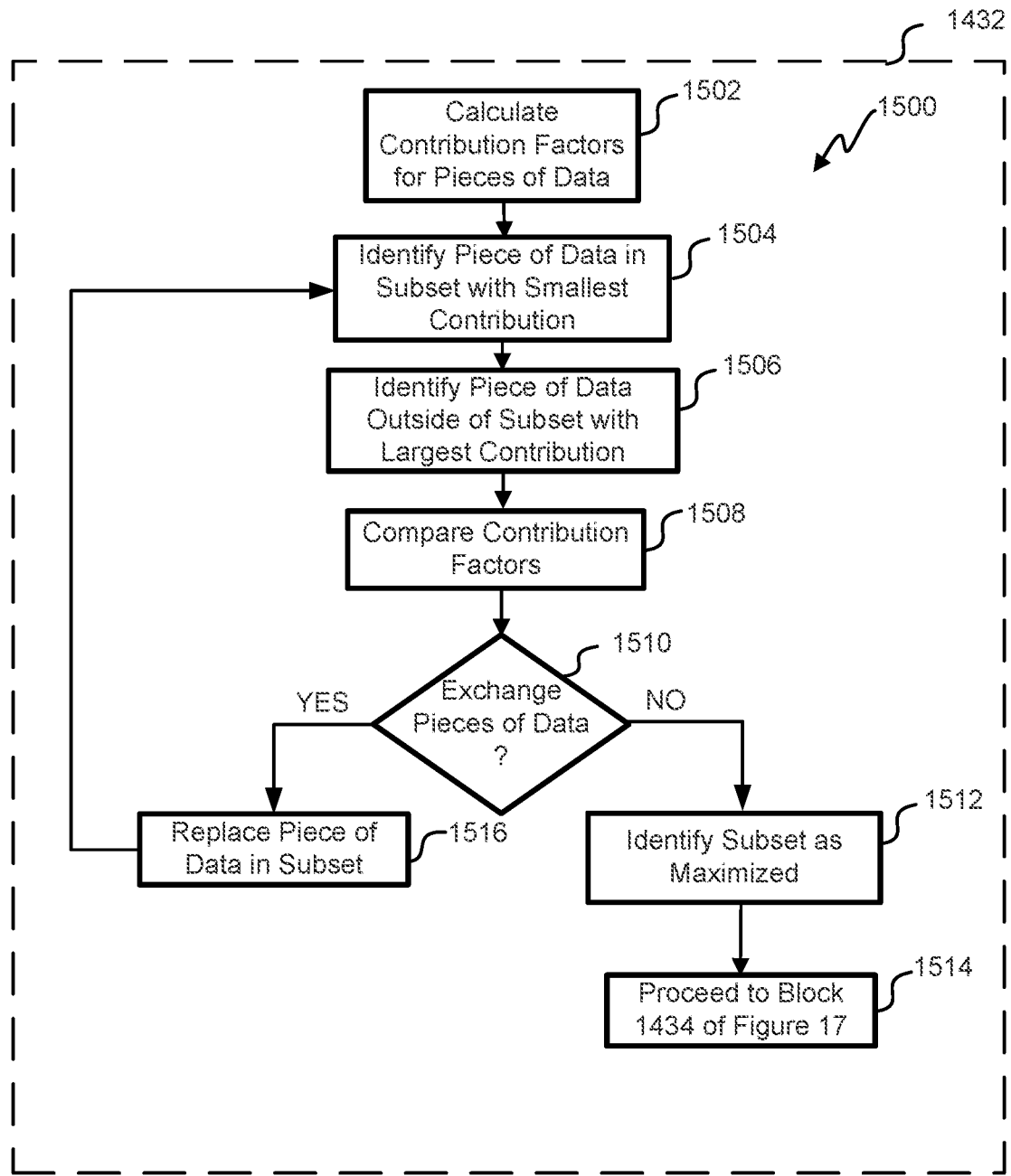
FIG. 18 is a flowchart illustrating one embodiment of a process for maximizing a measure indicative of a value of the subset.

With reference now to FIG. 18, a flowchart illustrating one embodiment of a process 1500 for maximizing a measure indicative of a value of the subset is shown. The process 1500 can be performed as a part of, or in place of block 1432 of FIG. 17. The process 1500 begins at block 1502, wherein contribution factors are calculated for the pieces of data of the subset, and specifically, in some embodiments, a contribution factor is calculated for each of the pieces of data of the subset. In some embodiments, the contribution factor can be a measure of the contribution of piece of data and/or group of data to the measure of the subset. Thus, the contribution factor can indicate whether the piece of data and/or data group positively, negatively, and/or neutrally contributes to the measure of the subset. In some embodiments, the contribution factors can be calculated based, at least in part, on the attribute vectors of the pieces of data of the subset.

After the contribution factors are calculated, the process 1500 proceeds to block 1504, wherein the piece of data in the subset that makes the smallest contribution to the optimization of the subset measure is identified. In some embodiments, this piece of data and/or data group can be identified with the contribution factors of the pieces of data and/or data groups of the subset. In embodiments in which the subset measure is being maximized, the piece of data and/or data group with the smallest contribution is the piece of data and/or data group having the smallest contribution factor. In some embodiments, a value can be associated with the piece of data in the subset making the smallest contribution to identify the piece of data and/or data group as such.

After the piece of data in the subset making the smallest contribution is identified, the process 1500 proceeds to block 1506, identifying the piece of data and/or group of data outside of the subset that would make the largest contribution to the optimization of the subset measure. In some embodiments, this piece of data and/or data group can be identified with the contribution factors of the pieces of data and/or data groups not included in the subset. In embodiments in which the subset measure is being maximized, the piece of data and/or data group that would make the largest contribution is the piece of data and/or data group having the largest contribution factor. In some embodiments, a value can be associated with the piece of data outside of the subset that would make the largest contribution to the optimization of the subset measure to identify the piece of data and/or data group as such.

After the piece of data and/or data group that would make the largest contribution to the optimization of the subset measure is identified, the process 1500 proceeds to block 1508 wherein the contribution factors of the piece of data and/or data group that would make the smallest contribution to the optimization of the subset measure and the piece of data and/or data group that would make the largest contribution to the optimization of the subset measure are compared. In some embodiments, this comparison can determine whether the contribution that would be made if the piece of data and/or data group that would make the largest contribution to the optimization of the subset measure were included in the subset is larger than the contribution of the piece of data and/or data group in the subset making the smallest contribution to the optimization of the subset measure. In embodiments in which the subset measure is being maximized, this block can include determining which of the pieces of data has a larger contribution factor. Thus, this comparison can determine whether the optimization measure is more optimized with the current pieces of data and/or data groups than it would be with the exchange of its weakest piece of data and/or data group with the strongest piece of data and/or data group that is not included in the subset.

In some embodiments, this comparison can be performed according to a Boolean function, wherein a first value, corresponding to a "true" condition, is associated with the subset if the subset measure would be more optimized by replacing the weakest of the pieces of data and/or data groups of the subset and a second value, corresponding to a "false" condition, is associated with the subset if the subset measure would not be more optimized replacing the weakest of the pieces of data and/or data groups of the subset.

After the contribution factors have been compared, the process 1500 proceeds to decision state 1510, wherein it determines whether to exchange the identified weakest piece of data and/or data group in the subset with the identified strongest piece of data and/or data group outside of the subset. In some embodiments, this determination can be made by retrieving the Boolean-value associated with the subset, and indicative of the result of the comparison of the contribution factors of the pieces of data. If the second value is associated with the subset, then the pieces of data are not exchanged and the process 1500 proceeds to block 1512, wherein the subset is identified as the optimized. In some embodiments, a value can be associated with some or all of the pieces of data and/or data groups in the optimized subset.

After the subset has been identified as maximized, the process 1500 proceeds to block 1514, and continues with block 1434 of FIG. 17. Returning again to decision state 1510, wherein, if the first value is associated with the subset, then the process 1500 proceeds to block 1516, and the pieces of data are exchanged. Specifically, the weakest piece of data and/or data group in the subset is replaced with the strongest piece of data and/or data group outside of the subset. After the pieces of data have been exchanged, the process 1500 returns to block 1504, and proceeds as outlined above. In some embodiments, the process 1500 can be repeated until the subset is identified as optimized.

Figure 19:
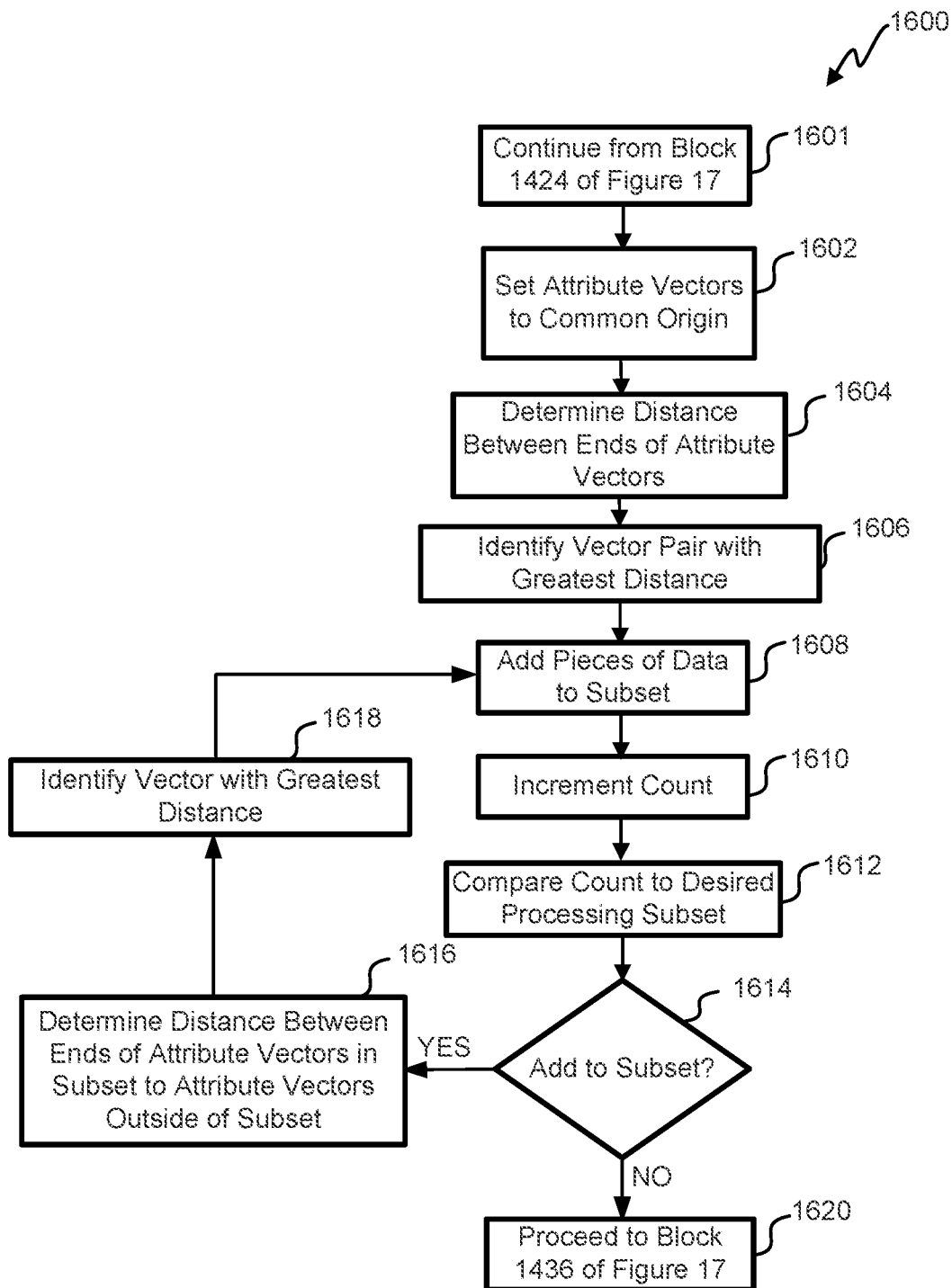
FIG. 19 is a flowchart illustrating an alternative embodiment of a process for selecting a subset.

With reference now to FIG. 19, a flowchart illustrating an alternative embodiment of a process 1600 for selecting a subset is shown. The process 1600 can be performed by one or several components of the distributed processing system 100, and in some embodiments, the process 1600 can be performed by the server 102. In some embodiments, process 1600 can be performed in connection with some or all of the steps of process 1400. In the embodiment depicted in FIG. 19, process 1600 can be performed in place of the steps of process 1400 shown in blocks 1426 to 1434.

As seen in FIG. 19, process 1600 continues from block 1424 of FIG. 17 and block 1601, and proceeds to block 1602, wherein the attribute vectors are set to a common origin. In some embodiments, this common origin can be achieved by setting the values for each of the dimensions of the vectors to a common value, and in some embodiments, by setting the values for each of the dimensions of the vectors to zero. After the common origin has been set, the process 1600 proceeds to block 1604, wherein the distances between the ends of the attribute vectors are determined. In some embodiments, this can include calculating the distance between the ends of some or all of the possible pairs of vectors of the processing tasks. Further, in some embodiments, values identifying a determined distance between the ends of a pair of vectors can be associated with that pair of vectors and can be stored.

After the distance between the ends of the attribute vectors has been determined, the process 1600 proceeds to block 1606, wherein the vector pair having ends separated by the greatest distance is identified. A value identifying the pair having ends separated by the greatest distance can be associated with the vector pair. After the vector pair having ends separated by the greatest distance is identified, the process 1600 proceeds to block 1608 wherein the pieces of data and/or data groups associated with the vectors in the vector pair having the greatest distance between their ends are included in the subset. In some embodiments, this inclusion in the subset can be achieved by associating a value indicative of inclusion in the subset with one or both of the pieces of data and/or data groups associated with the vectors forming the vector pair. After and/or simultaneous with the inclusion of the pieces of data and/or groups of data in the subset, a count can be incremented as indicated in block 1610. In some embodiments, this count can identify the number of pieces of data and/or data groups included in the subset. After the count has been incremented, the process 1600 proceeds to block 1612, wherein the count is compared to the desired size of the subset. In some embodiments, this comparison can be performed according to a Boolean function, wherein a first value, corresponding to a "true" condition, is associated with the subset if the count is smaller than the desired number of pieces of data and/or data groups in the subset and a second value, corresponding to a "false" condition, is associated with the subset if the count matches the desired number of pieces of data and/or data groups in the subset.

After the count has been compared with the desired number of pieces of data and/or data groups in the subset, the process 1600 proceeds to decision state 1614, wherein it is determined whether to add additional pieces of data and/or data groups to the subset. In some embodiments, this determination can be made by retrieving the Boolean-value associated with the subset, and indicative of the result of the comparison of the count to the desired number of pieces of data and/or data groups in the subset.

If the first value is associated with the processing task, then additional pieces of data and/or data groups are to be added to the subset, and the process 1600 proceeds to block 1616, wherein the distance between the ends of the attribute vectors in the subset and the ends of the attribute vectors outside of the subset are determined. In some embodiments, this is performed by pairing each of the vectors within the subset with each of the vectors outside of the subset and determining the distance between the ends of the vectors forming the pairs. In some embodiments, this distance can be determined by pairing each of the vectors most recently added to the subset, and in some embodiments, each of the vectors from the vector pair most recently added to the subset, with some or all of the vectors outside of the subset. After the distances have been determined, the process 1600 proceeds to block 1618, wherein one or several additional vectors are identified. In some embodiments, these one or several additional vectors are identified because of the additional diversity that these one or several vectors would add to the subset by their inclusion in the subset. This additional diversity can be determined in a number of different ways. In some embodiments, for example, the one or several additional vectors can be selected as the vectors having ends separated by the greatest distance from the ends of vectors in the subset. In another embodiment, these one or several additional vectors can be selected for inclusion in the subset by determining the distance between their ends and the ends of the vectors in the subset. For each vector, the smallest of the distances between their end and the ends of the vectors in the subset is determined, and the one or several vectors are added that have the greatest, smallest distance between their ends and the ends of the vectors in the subset. After these vectors have been identified, the process 1600 returns to block 1608, and proceeds as outlined above.

Returning again to decision state 1620, if the second value is associated with the processing task, then no additional pieces of data and/or groups of data are to be added to the subset, and the process 1600 proceeds to block 1620, and returns to block 1436 of FIG. 17.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system, comprising:
   a database coupled to a computer network and storing:
      a plurality of tasks; and
      an accuracy parameter for each of the plurality of tasks;
   a first computing device coupled to the computer network;
   a second computing device coupled to the computer network; and
   a server, comprising at least one server hardware computing device coupled to the computer network and including at least one processor executing instructions within memory which, when executed, cause the system to:
      select, from the database, a task within the plurality of tasks;
      transmit the task through the computer network to the first computing device and the second computing device;
      receive, through the computer network, a first evaluation characterizing the task from the first computing device and a second evaluation characterizing the task from the second computing device;
      select, from the database, the accuracy parameter for the task, the accuracy parameter characterizing an attribute common to the first evaluation and the second evaluation;
      generate an updated accuracy parameter according to at least one difference between a stored characterization, and a characterization derived from the first evaluation or the second evaluation; and
      update the accuracy parameter within the database to reflect the updated accuracy parameter.

2. The system of claim 1, wherein the instructions, when executed, further cause the system to:

identify a plurality of computing devices sharing a common computing device parameter; and
select the first computing device and the second computing device from the plurality of computing devices.

3. The system of claim 2, wherein the instructions, when executed, further cause the system to:
transmit at least one additional evaluation through the computer network to at least one additional computing device in the plurality of computing devices;
receive, from the at least one additional computing device, at least one additional evaluation;
generate the updated accuracy parameter according to at least one difference between the first evaluation, the second evaluation, and the at least one additional evaluation; and
update the accuracy parameter within the database to reflect the updated accuracy parameter.

4. The system of claim 3, wherein the instructions, when executed, further cause the system to coordinate a plurality of processing resources in the plurality of computing devices to complete the task.

5. The system of claim 4, wherein the instructions, when executed, further cause the system to:
transmit a first instruction to the first computing device to complete a first portion of the task; and
transmit a second instruction to the second computing device to complete a second portion of the task.

6. The system of claim 4, wherein the instructions, when executed, further cause the system to:
identify, within the plurality of computing devices, a plurality of latent or unused resources; and
coordinate the plurality of latent or unused resources to complete at least one additional task.

7. The system of claim 1, wherein the instructions, when executed, further cause the system to:
divide the task into a plurality of subtasks;
generate, from each of the plurality of subtasks, a metric indicating a processing efficiency of each of the plurality of subtasks;
identify, within the plurality of subtasks, at least one subtask associated with the metric below a predetermined threshold; and
replace each of the at least one subtask with a replacement subtask, having the metric above the predetermined threshold.

8. The system of claim 7, wherein the metric identifies at least one contribution factor within each of the plurality of subtasks, wherein the at least one contribution factor for the at least one subtask indicates a lower positive effect on the processing efficiency, and the at least one contribution factor for the replacement subtask indicates a higher positive effect on the processing efficiency.

9. A method comprising:
storing, by a server comprising at least one server hardware computing device coupled to a computer network and including at least one processor executing instructions within memory, within a database coupled to the computer network:
a plurality of tasks; and
an accuracy parameter for each of the plurality of tasks;
selecting, by the server from the database, a task within a plurality of tasks;
transmitting, by the server, the task through the computer network to a first computing device coupled to the computer network, and to a second computing device coupled to the computer network;
receiving, by the server through the computer network, a first evaluation characterizing the task from the first computing device and a second evaluation characterizing the task from the second computing device;
selecting, by the server from the database, the accuracy parameter for the task, the accuracy parameter characterizing an attribute common to the first evaluation and the second evaluation;
generating, by the server, an updated accuracy parameter according to at least one difference between a stored characterization, and a characterization derived from the first evaluation or the second evaluation; and
updating, by the server, the accuracy parameter within the database to reflect the updated accuracy parameter.

10. The method of claim 9, further comprising the step of coordinating the completion of the task, as a processing task, among a plurality of processing resources within a plurality of computing devices including the first computing device and the second computing device.

11. The method of claim 9, wherein the first computing device is operated in a distributed processing environment in a first geographical location, and the second computing device is operated in the distributed processing environment in a second geographical location.

12. The method of claim 9, further comprising the step of receiving:
the first evaluation as a first user input from the first computing device and the second evaluation as a second user input from the second computing device; or
the first evaluation as an output from a first automated process on the first computing device and the second evaluation as a second automated process on the second computing device.

13. The method of claim 9, further comprising the steps of:
dividing, by the server, the task into a plurality of subtasks;
generating, by the server from each of the plurality of subtasks, a metric indicating a processing efficiency of each of the plurality of subtasks;
identifying, by the server within the plurality of subtasks, at least one subtask associated with the metric below a predetermined threshold; and
replacing, by the server, each of the at least one subtask with a replacement subtask, having the metric above the predetermined threshold.

14. The method of claim 13, wherein the metric identifies at least one contribution factor within each of the plurality of subtasks, wherein the at least one contribution factor for the at least one subtask indicates a lower positive effect on the processing efficiency, and the at least one contribution factor for the replacement subtask indicates a higher positive effect on the processing efficiency.

15. A system comprising a server, comprising at least one server hardware computing device coupled to a computer network and including at least one processor executing instructions within memory, configured to:
store, within a database coupled to the computer network:
a plurality of tasks; and
an accuracy parameter for each of the plurality of tasks;
select, from the database, a task within a plurality of tasks;
transmit the task through the computer network to a first computing device coupled to the computer network, and to a second computing device coupled to the computer network;
receive, through the computer network, a first evaluation characterizing the task from the first computing device and a second evaluation characterizing the task from the second computing device;

select, from the database, the accuracy parameter for the task, the accuracy parameter characterizing an attribute common to the first evaluation and the second evaluation;

generate an updated accuracy parameter according to at least one difference between a stored characterization, and a characterization derived from the first evaluation or the second evaluation; and update the accuracy parameter within the database to reflect the updated accuracy parameter.

16. The system of claim 15, wherein the server is further configured to:

divide the task into a plurality of subtasks;

generate, from each of the plurality of subtasks, a metric indicating a processing efficiency of each of the plurality of subtasks;

identify, within the plurality of subtasks, at least one subtask associated with the metric below a predetermined threshold; and replace each of the at least one subtask with a replacement subtask, having the metric above the predetermined threshold.

17. The system of claim 16, wherein the metric identifies at least one contribution factor within each of the plurality of subtasks, wherein the at least one contribution factor for the at least one subtask indicates a lower positive effect on the processing efficiency, and the at least one contribution factor for the replacement subtask indicates a higher positive effect on the processing efficiency.

18. The system of claim 15, wherein the server is further configured to coordinate a plurality of processing resources in a plurality of computing devices to complete the task.

19. The system of claim 18, wherein the server is further configured to:

transmit a first instruction to the first computing device to complete a first portion of the task; and transmit a second instruction to the second computing device to complete a second portion of the task.

20. The system of claim 18, wherein the server is further configured to:

identify, within the plurality of computing devices, a plurality of latent or unused resources; and coordinate the plurality of latent or unused resources to complete at least one additional task.

* * * * *